Figure 35:
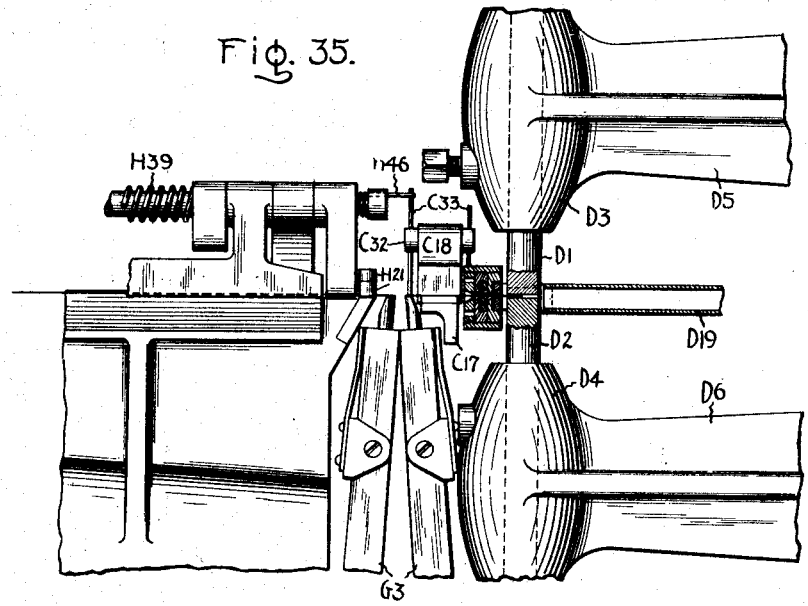

J. T. FAGAN & C. H. QUACKENBUSH.
WELDING MACHINE.
APPLICATION FILED JULY 27, 1914.
1,213,852. Patented Jan. 30, 1917.
23 SHEETS—SHEET 1.
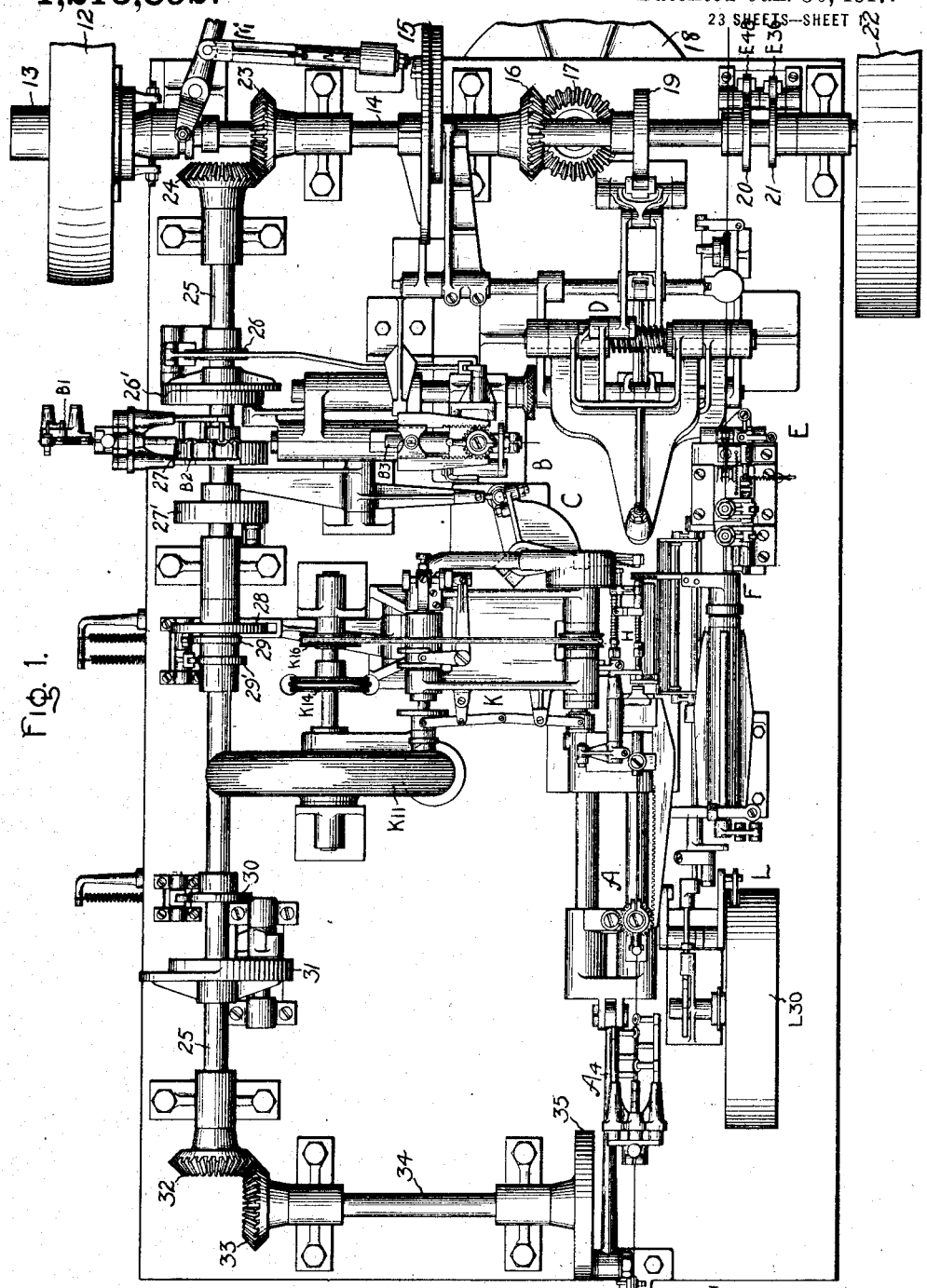
WITNESSES:
INVENTORS:
J. T. FAGAN,
C. H. QUACKENBUSH,
BY Albert G. Davis
THEIR ATTORNEY.

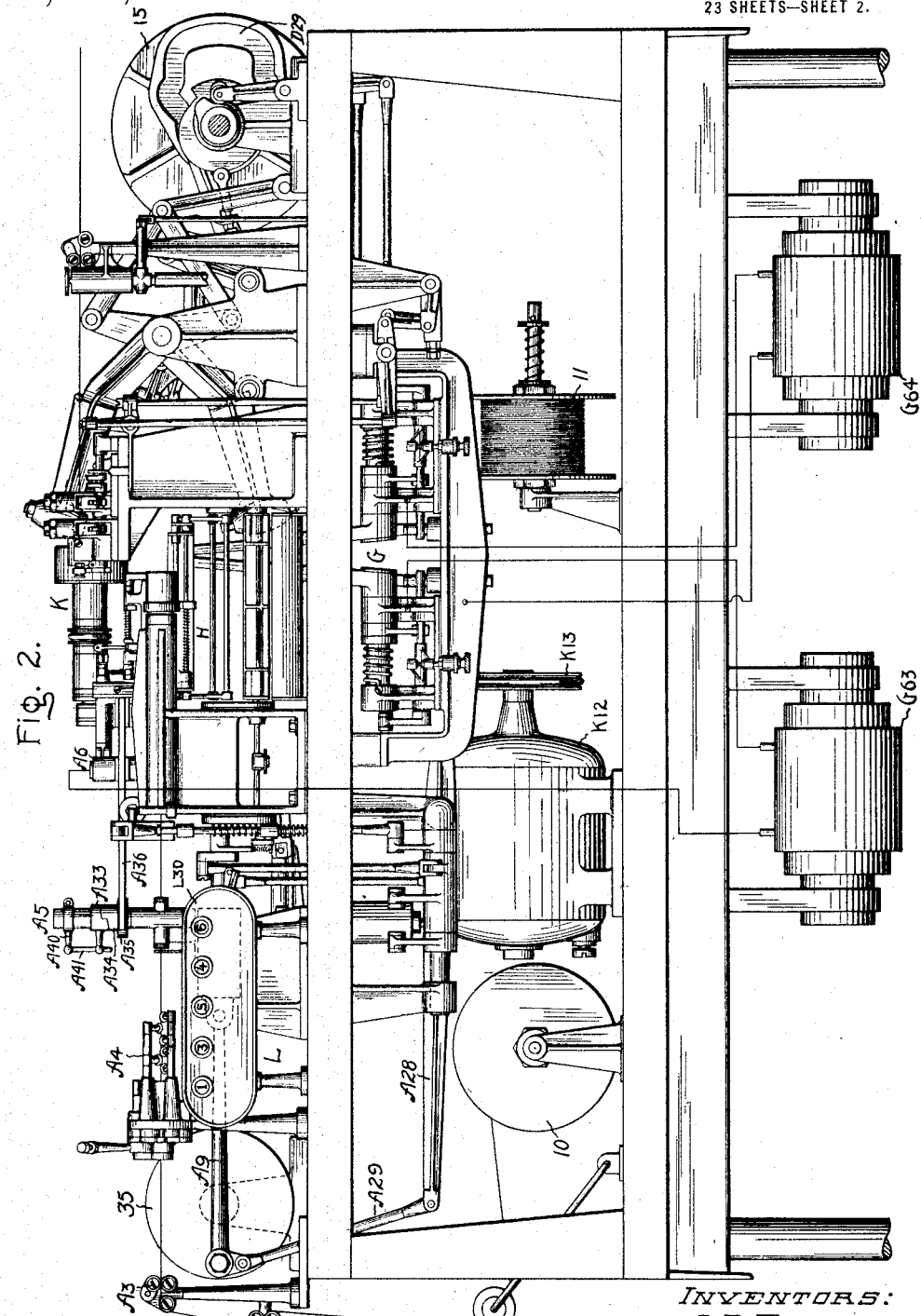

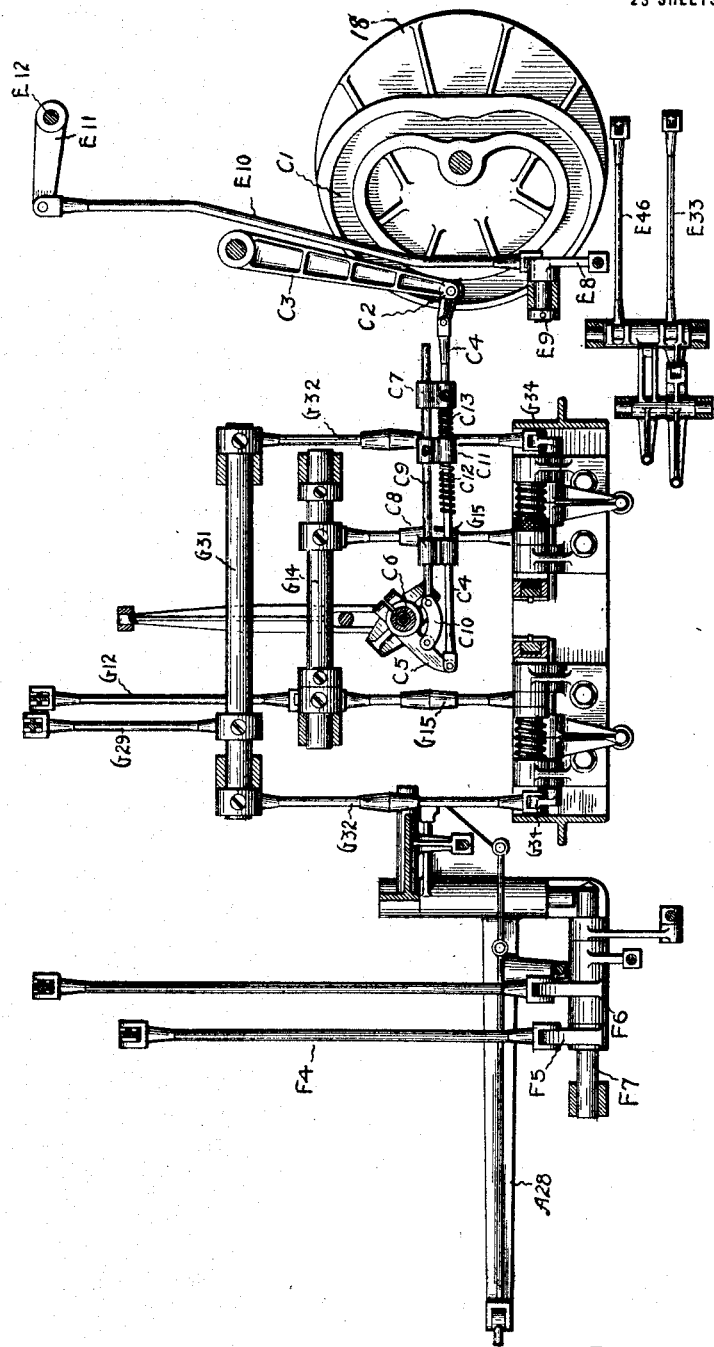

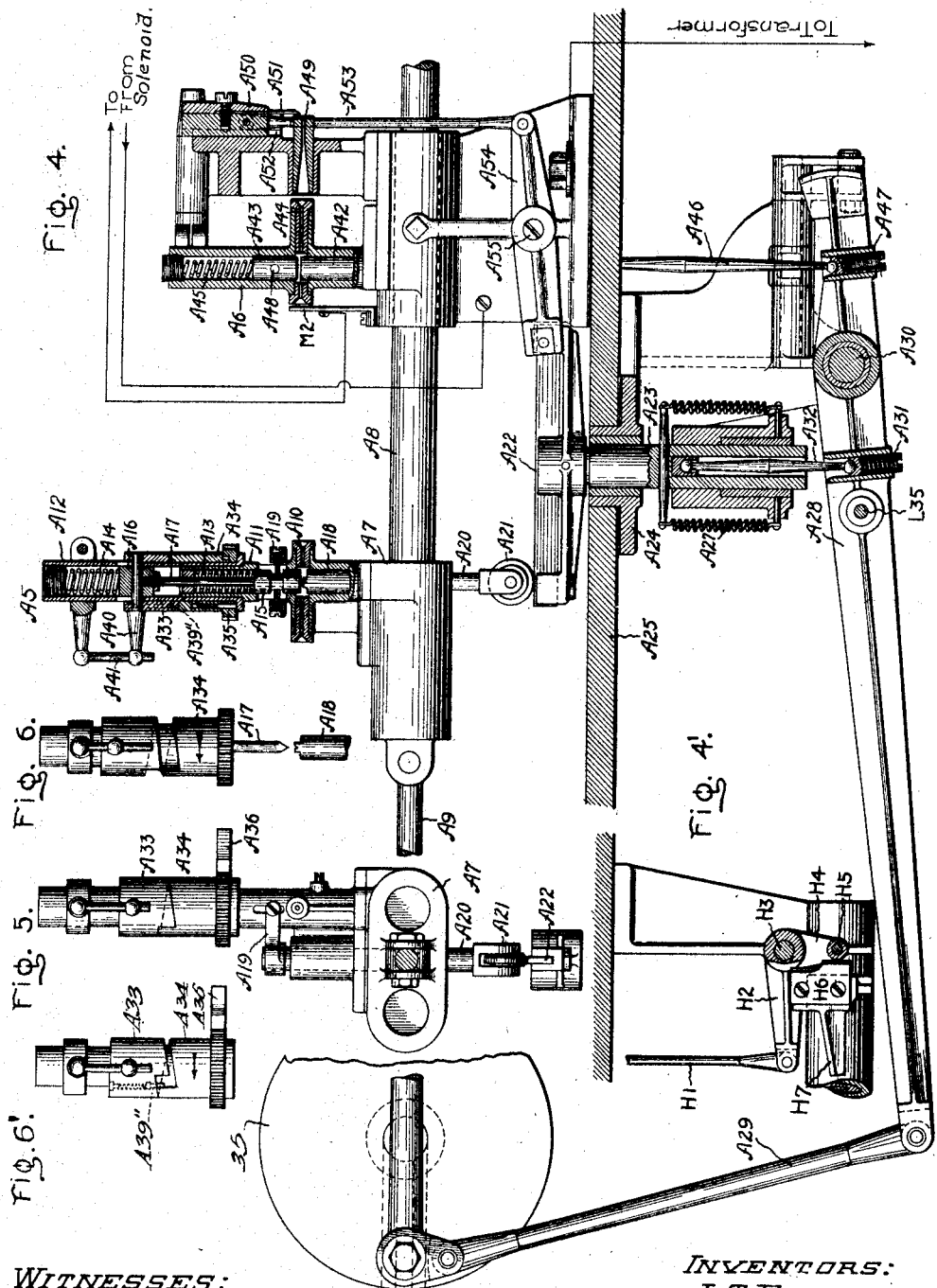

J. T. FAGAN & C. H. QUACKENBUSH.
WELDING MACHINE.
APPLICATION FILED JULY 27, 1914.
1,213,852. Patented Jan. 30, 1917.
23 SHEETS—SHEET 5.
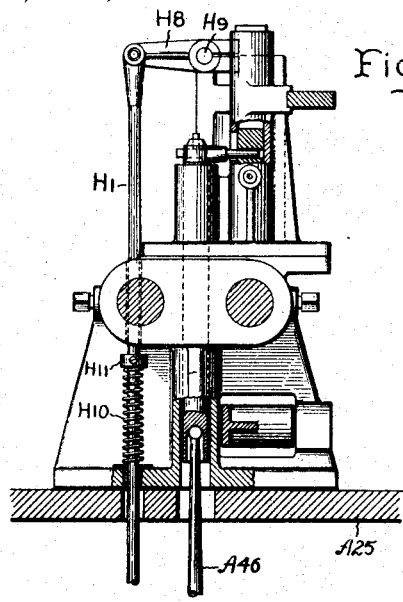
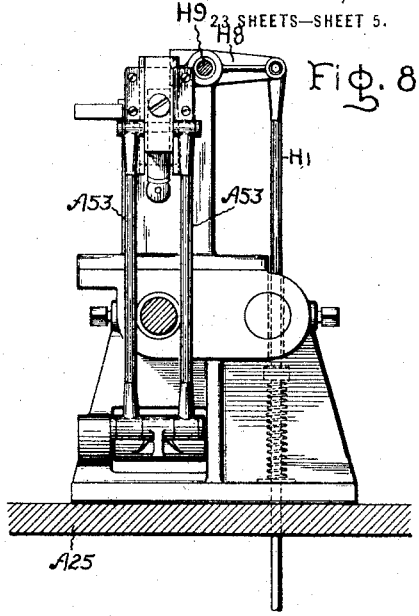
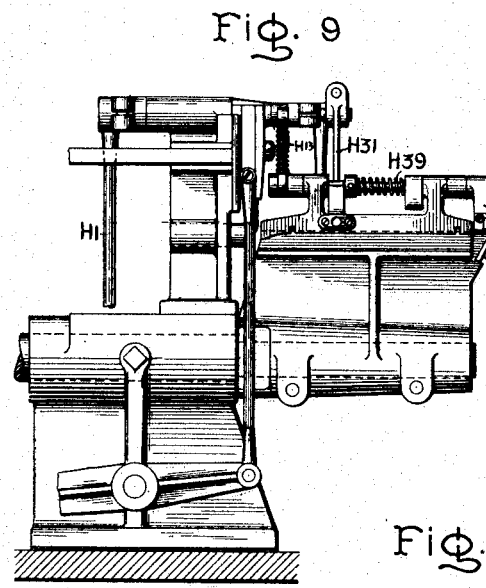
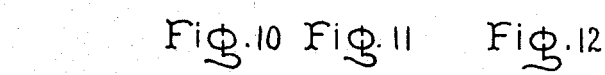
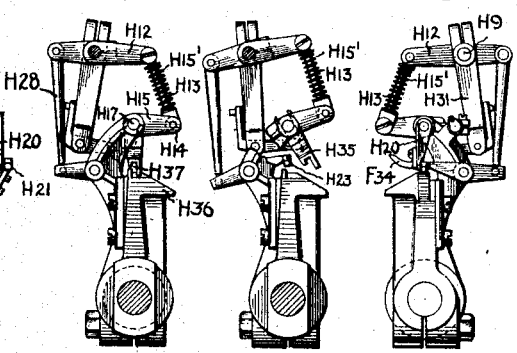
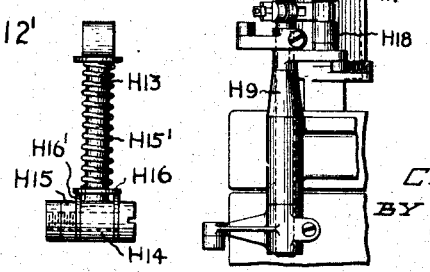
Witnesses:
INVENTORS:
J. T. FAGAN,
C. H. QUACKENBUSH,
BY
THEIR ATTORNEY.

J. T. FAGAN & C. H. QUACKENBUSH.
WELDING MACHINE.
APPLICATION FILED JULY 27, 1914.
1,213,852. Patented Jan. 30, 1917.
23 SHEETS—SHEET 6.
Fig. 14
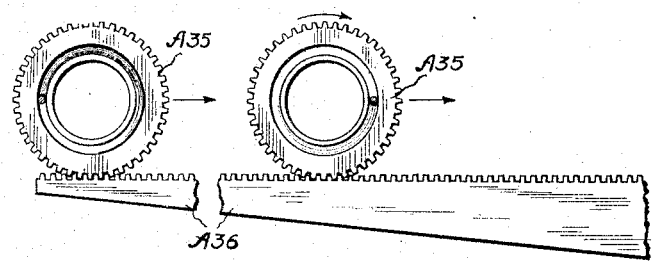
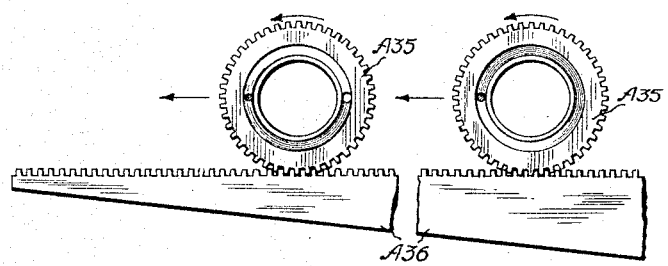
Fig. 15
Fig. 16 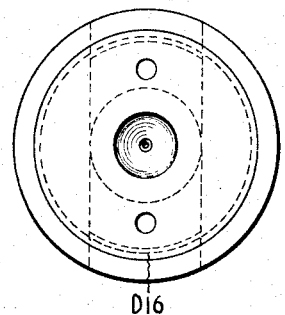 Fig. 17 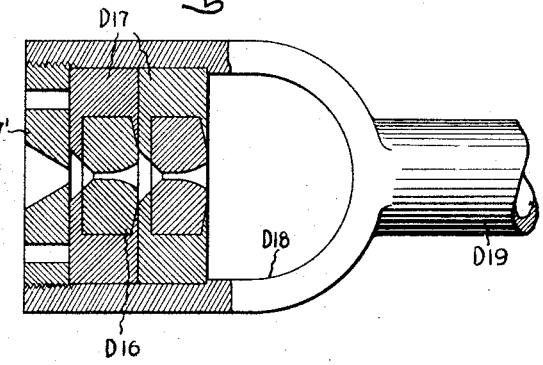
WITNESSES:
INVENTORS:
J. T. FAGAN,
C. H. QUACKENBUSH,
BY
THEIR ATTORNEY.

J. T. FAGAN & C. H. QUACKENBUSH.
WELDING MACHINE.
APPLICATION FILED JULY 27, 1914.
1,213,852.
Patented Jan. 30, 1917.
23 SHEETS—SHEET 7.
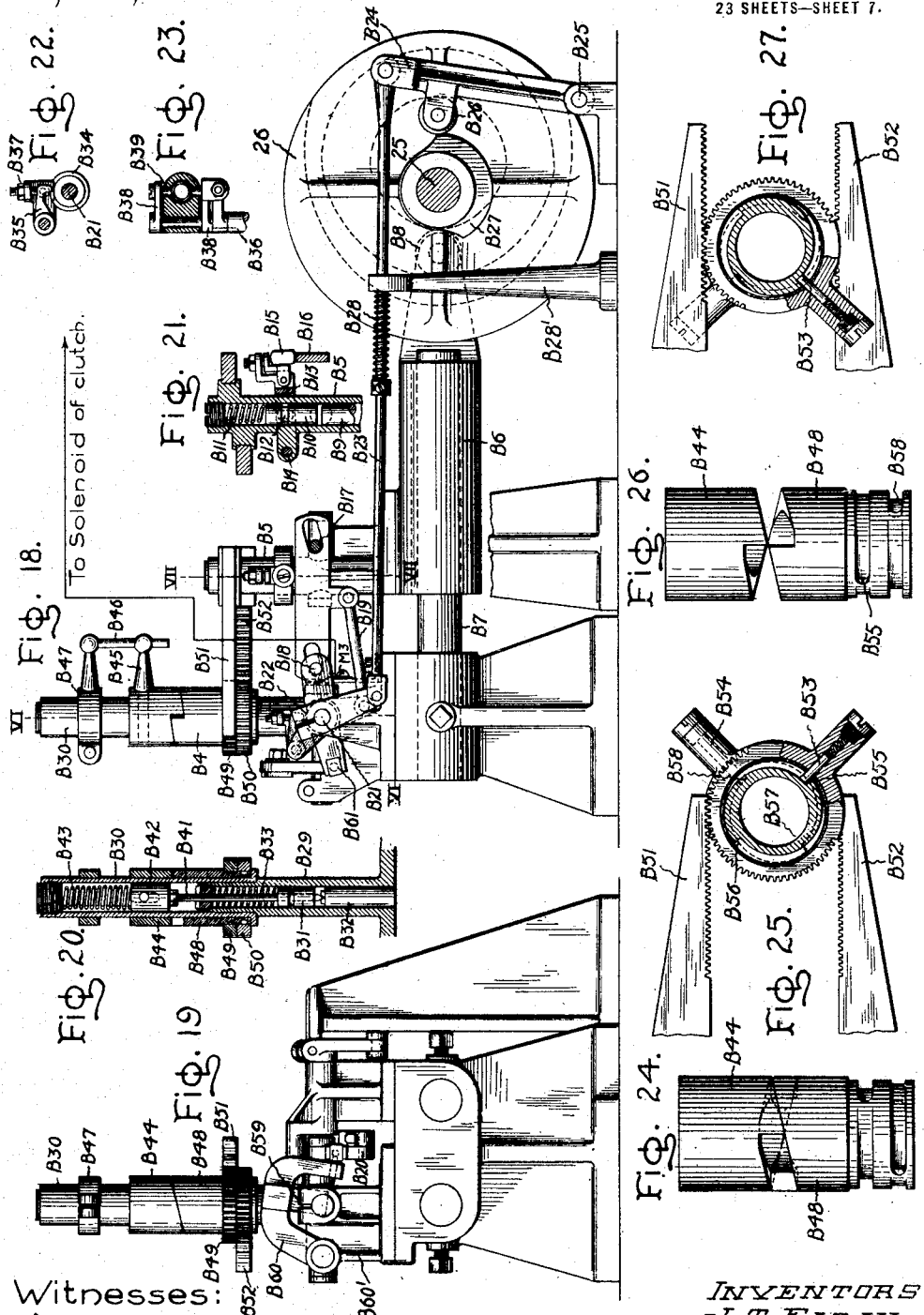
Witnesses:
INVENTORS:
J. T. FAGAN,
C. H. QUACKENBUSH,
BY
THEIR ATTORNEY.

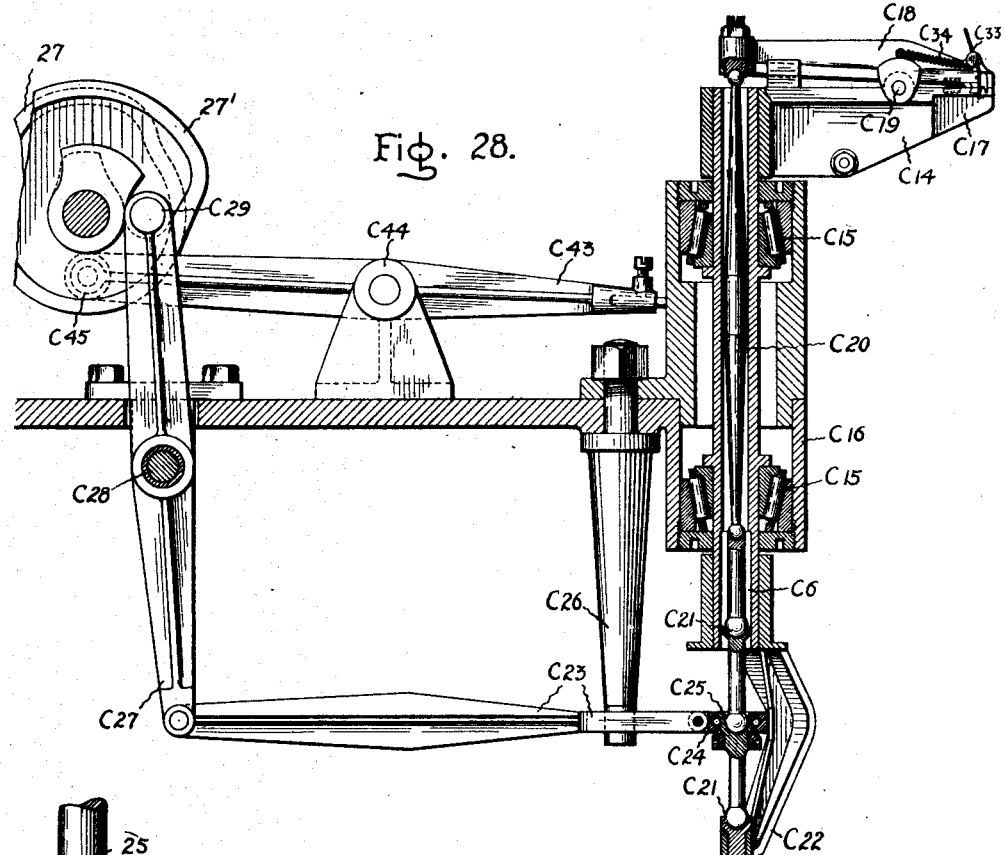
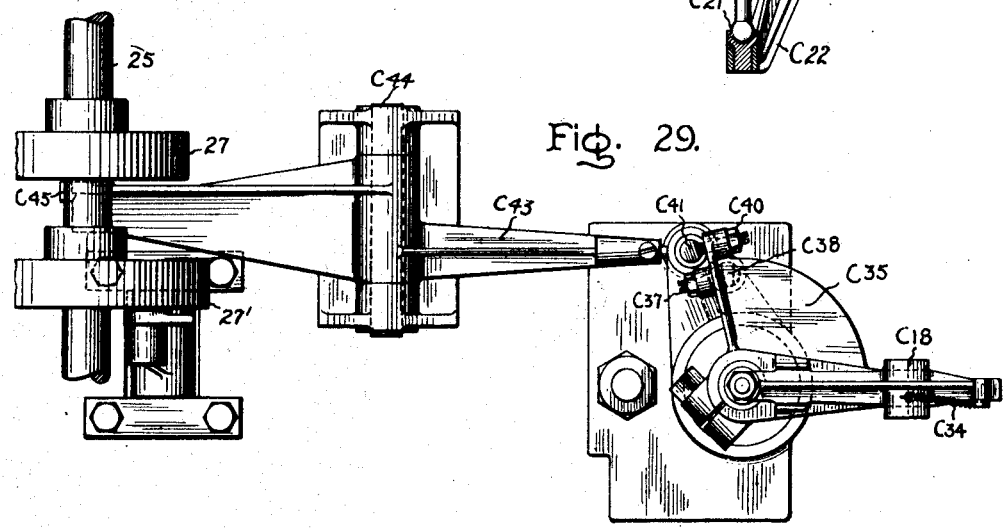

J. T. FAGAN & C. H. QUACKENBUSH.
WELDING MACHINE.
APPLICATION FILED JULY 27, 1914.
1,213,852.
Patented Jan. 30, 1917.
23 SHEETS—SHEET 9.
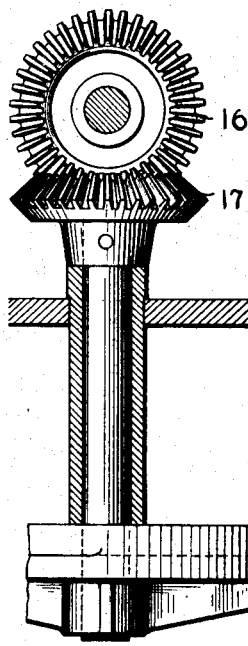
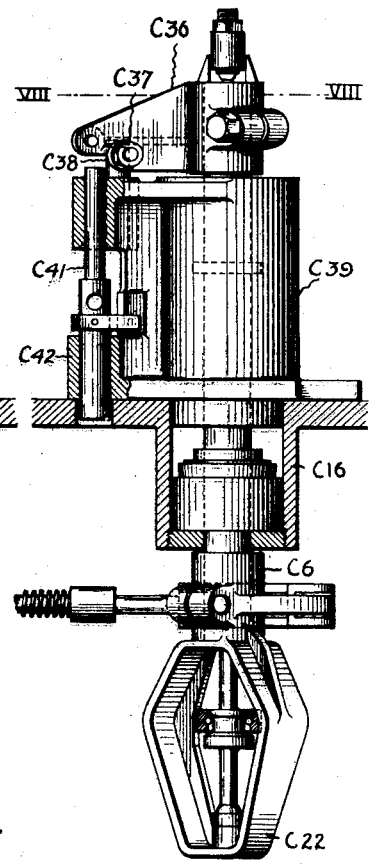
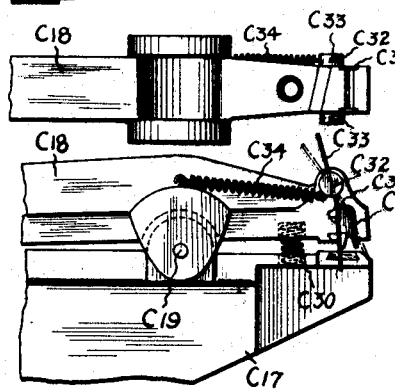
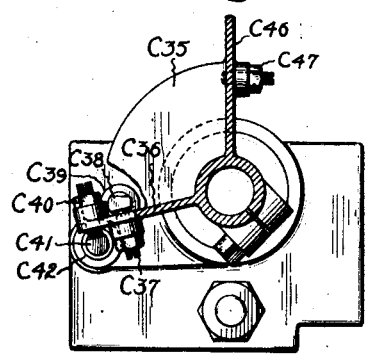
Fig. 30.
Fig. 32.
Fig. 31.
Fig. 33.
Fig. 34.
Witnesses:
INVENTORS:
J. T. FAGAN,
C. H. QUACKENBUSH,
BY
THEIR ATTORNEY.

J. T. FAGAN & C. H. QUACKENBUSH.
WELDING MACHINE.
APPLICATION FILED JULY 27, 1914.

1,213,852.

Patented Jan. 30, 1917.
23 SHEETS—SHEET 10.

WITNESSES:

INVENTORS:
J. T. FAGAN,
C. H. QUACKENBUSH,
BY
THEIR ATTORNEY.

J. T. FAGAN & C. H. QUACKENBUSH.
WELDING MACHINE.
APPLICATION FILED JULY 27, 1914.
1,213,852.
Patented Jan. 30, 1917.
23 SHEETS—SHEET 11.
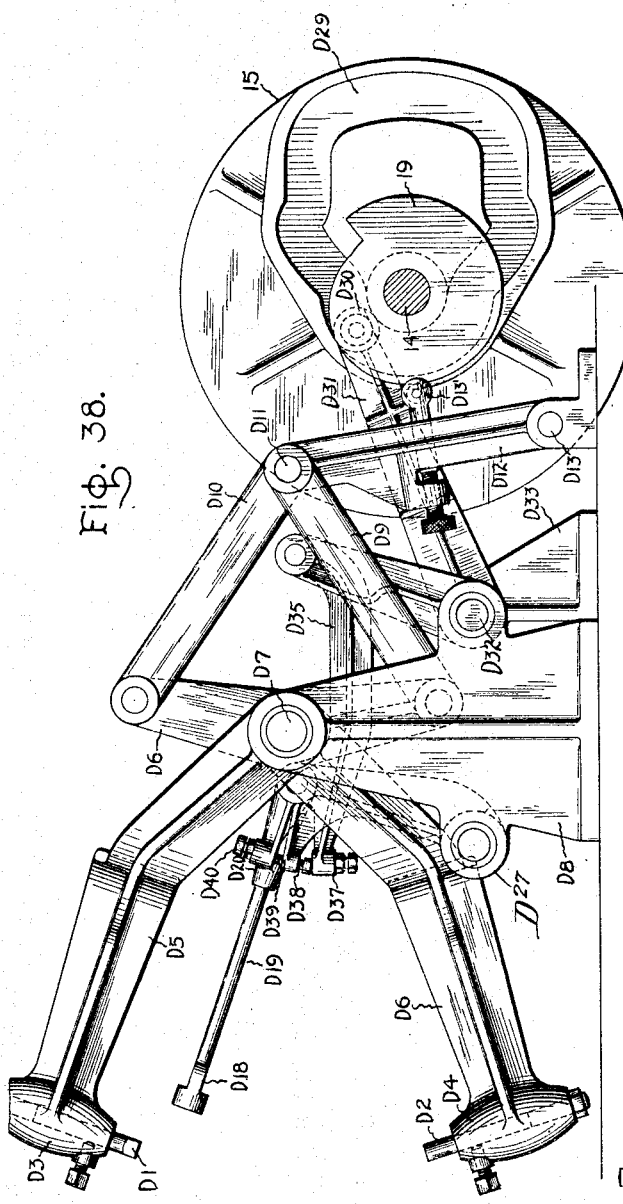
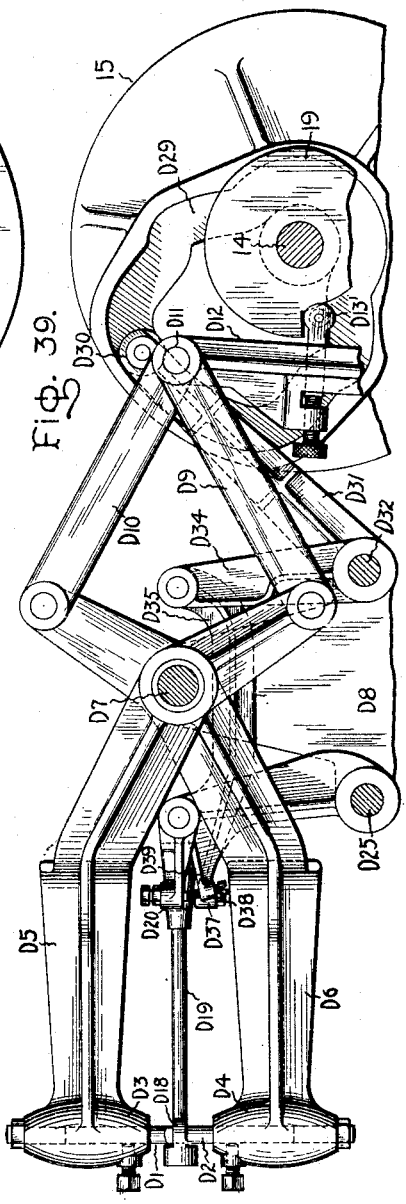
Witnesses:
INVENTORS:
J. T. FAGAN,
C. H. QUACKENBUSH,
BY
THEIR ATTORNEY.

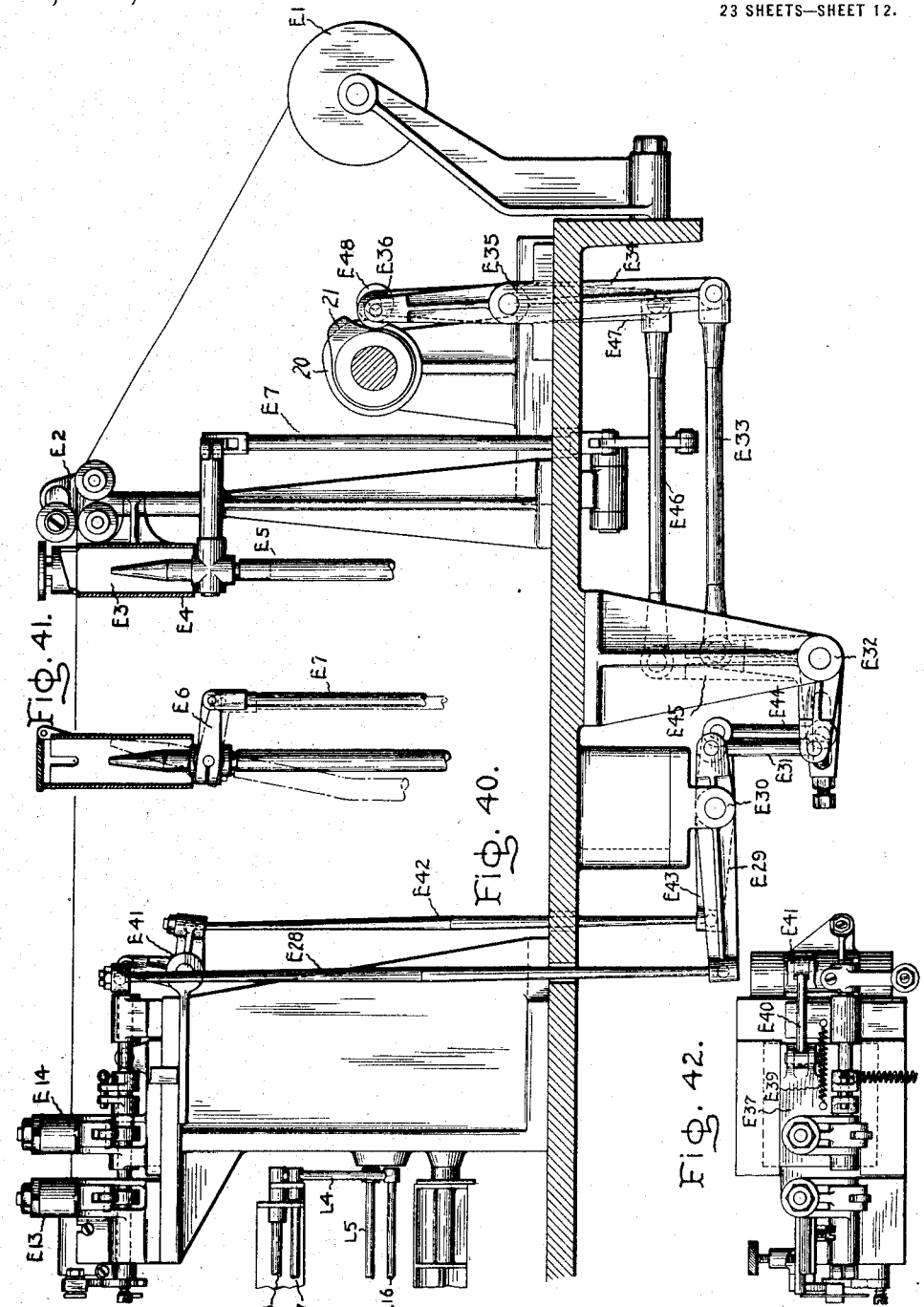

J. T. FAGAN & C. H. QUACKENBUSH.
WELDING MACHINE.
APPLICATION FILED JULY 27, 1914.
1,213,852.
Patented Jan. 30, 1917.
23 SHEETS—SHEET 13.
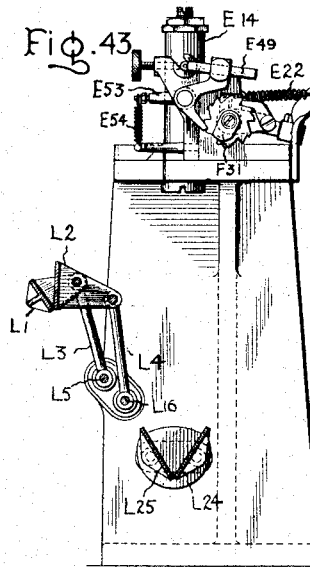
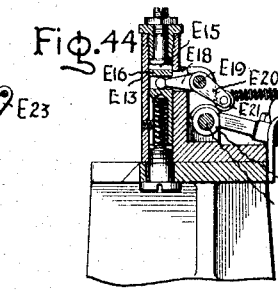
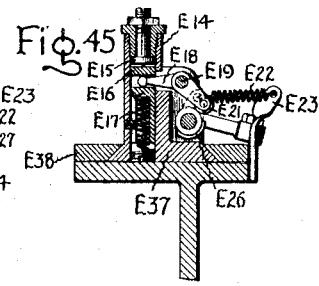
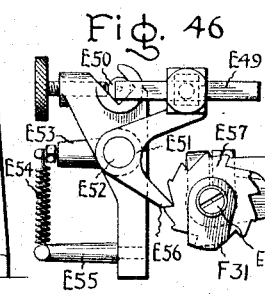
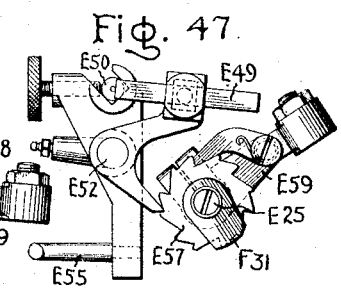
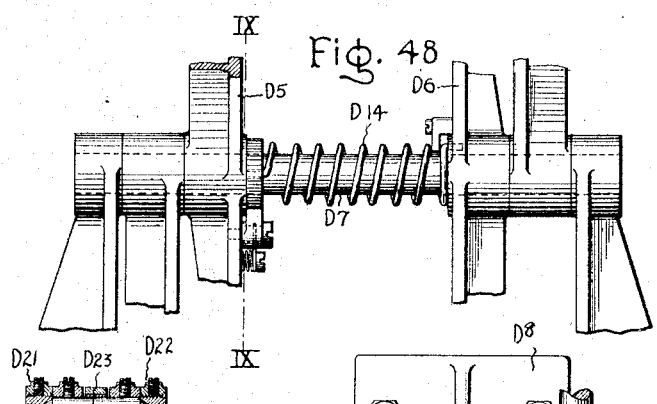
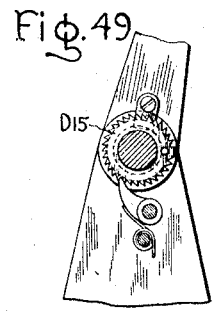
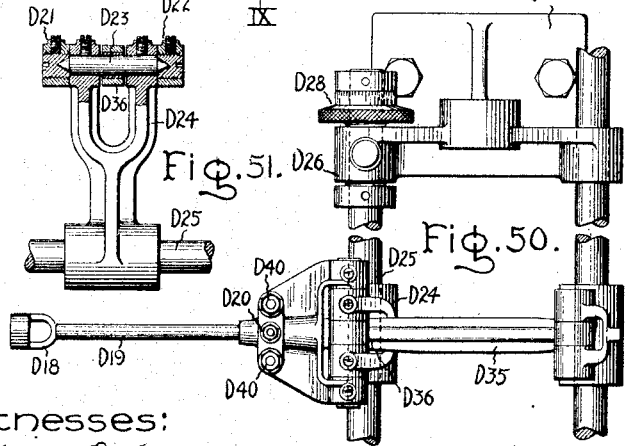
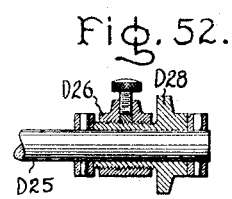
Witnesses:
INVENTORS:
J. T. FAGAN,
C. H. QUACKENBUSH;
BY
THEIR ATTORNEY.

J. T. FAGAN & C. H. QUACKENBUSH.
WELDING MACHINE.
APPLICATION FILED JULY 27, 1914.
1,213,852.
Patented Jan. 30, 1917.
23 SHEETS—SHEET 14.
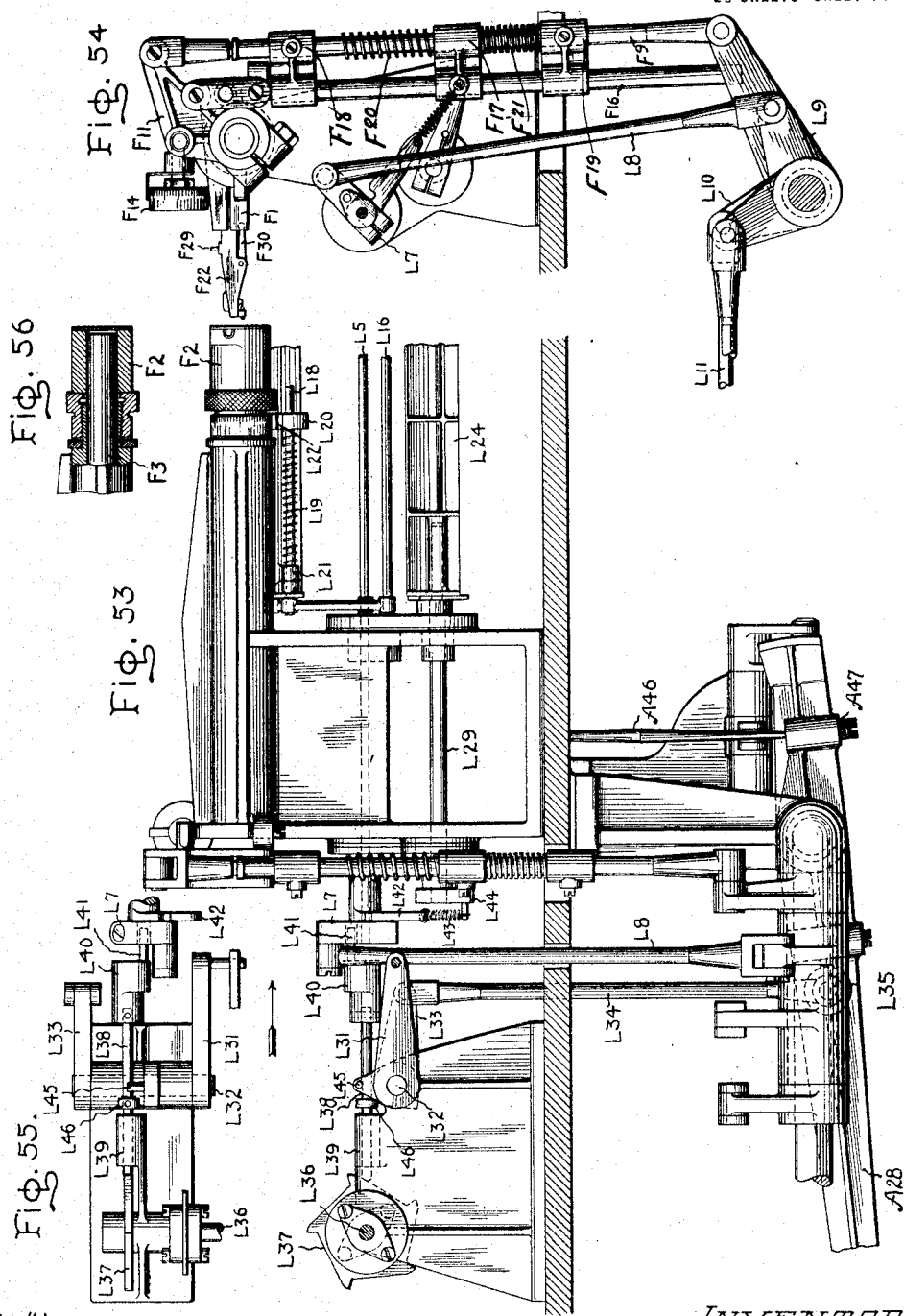
Witnesses:
INVENTORS:
J. T. FAGAN,
C. H. QUACKENBUSH,
BY
THEIR ATTORNEY.

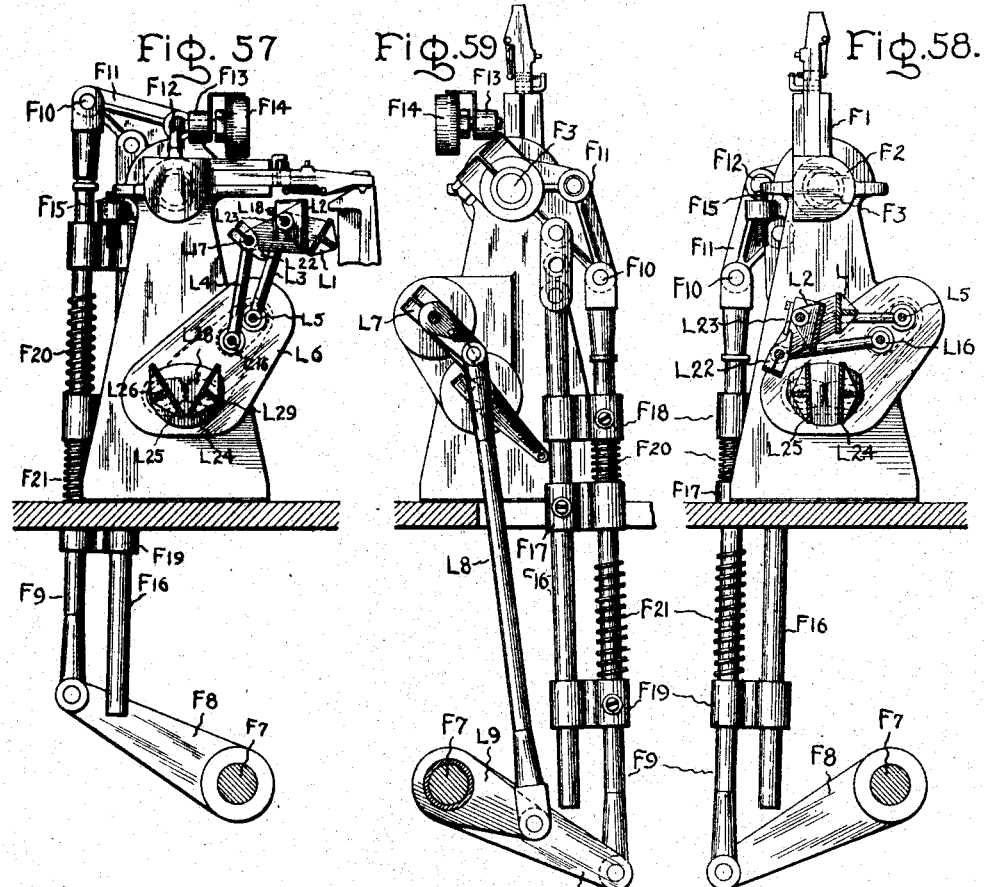

J. T. FAGAN & C. H. QUACKENBUSH.
WELDING MACHINE.
APPLICATION FILED JULY 27, 1914.

1,213,852.

Patented Jan. 30, 1917.
23 SHEETS—SHEET 16.

WITNESSES:

INVENTORS:
J. T. FAGAN,
C. H. QUACKENBUSH,
BY
THEIR ATTORNEY.

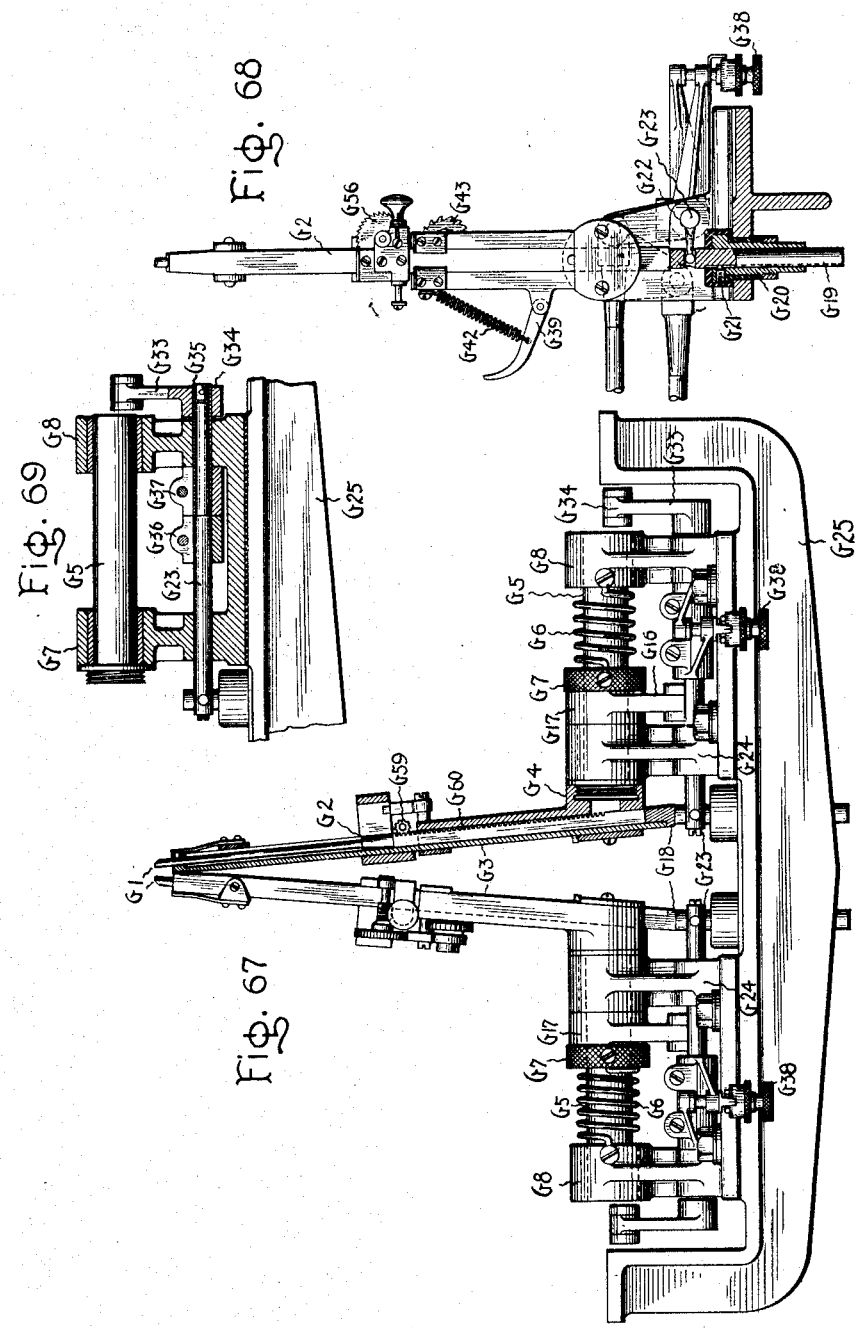

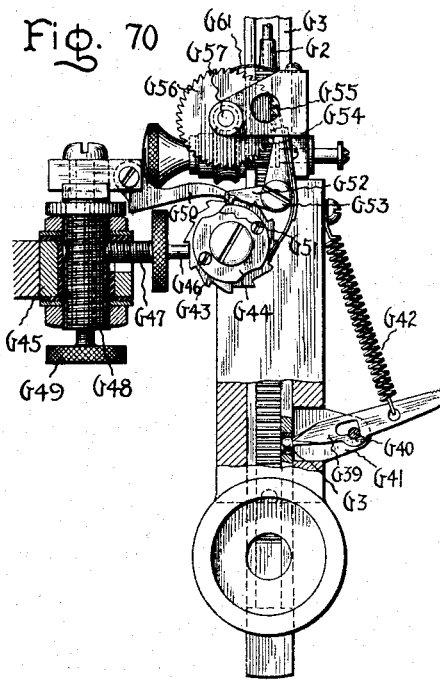
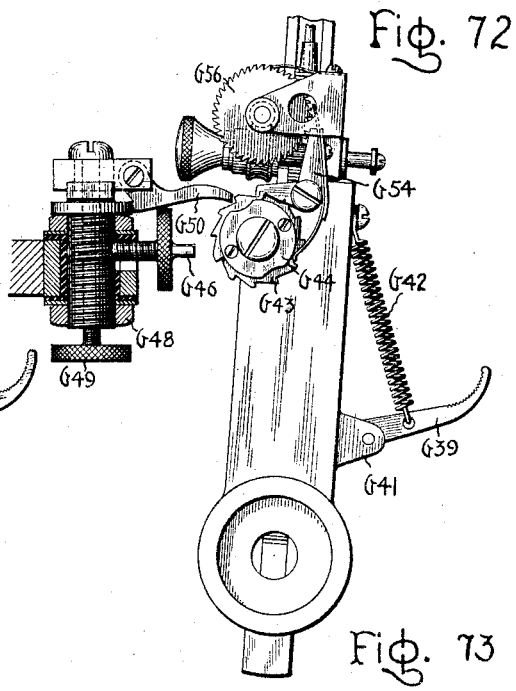
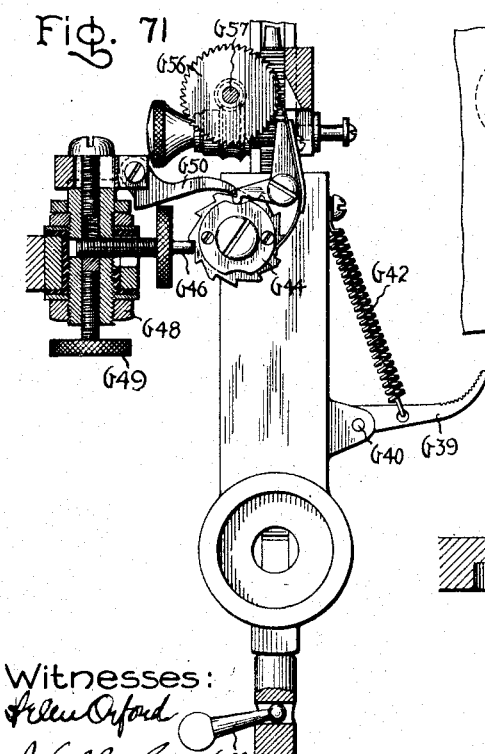
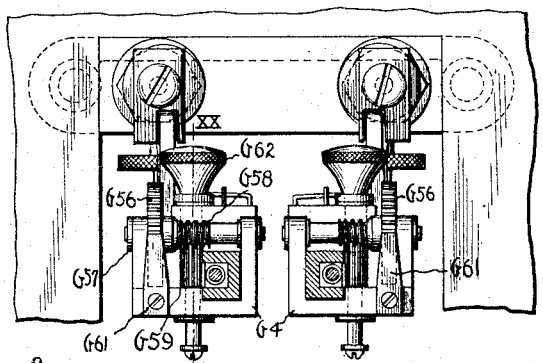
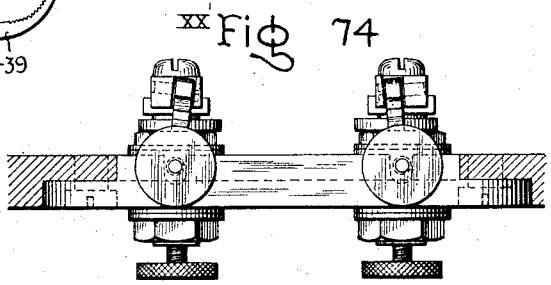

J. T. FAGAN & C. H. QUACKENBUSH.
WELDING MACHINE.
APPLICATION FILED JULY 27, 1914.
1,213,852.
Patented Jan. 30, 1917.
23 SHEETS—SHEET 19.
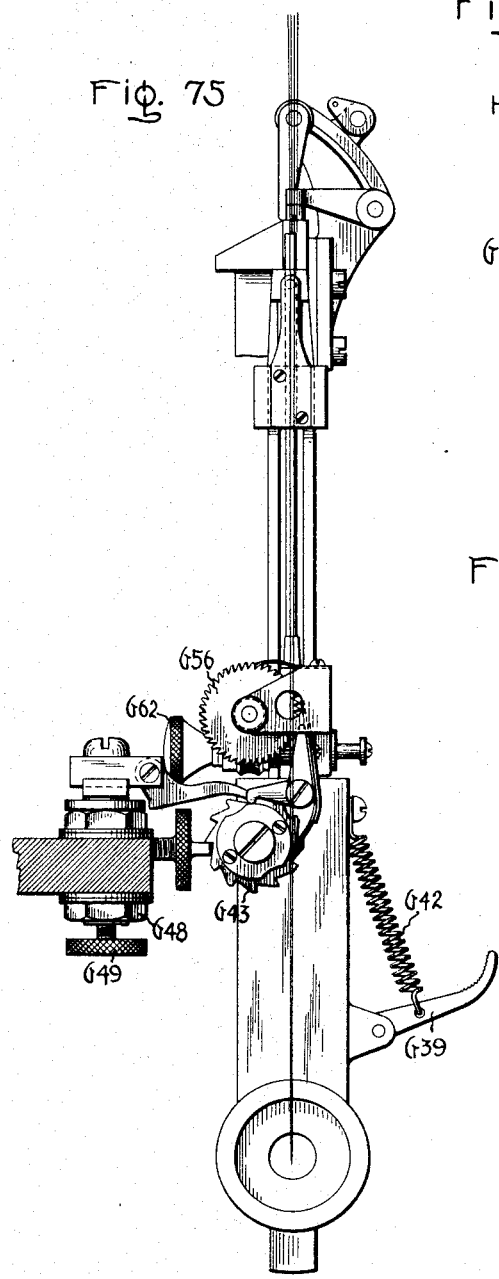
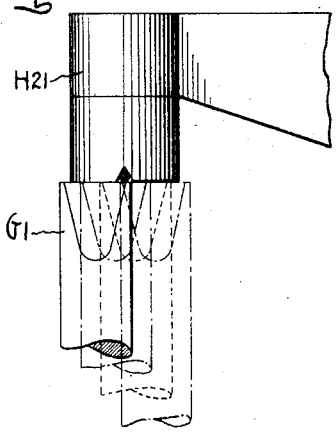
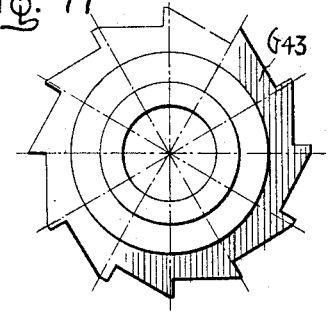
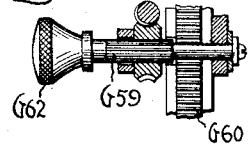
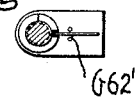
WITNESSES:
INVENTORS:
J. T. FAGAN,
C. H. QUACKENBUSH,
BY
THEIR ATTORNEY.

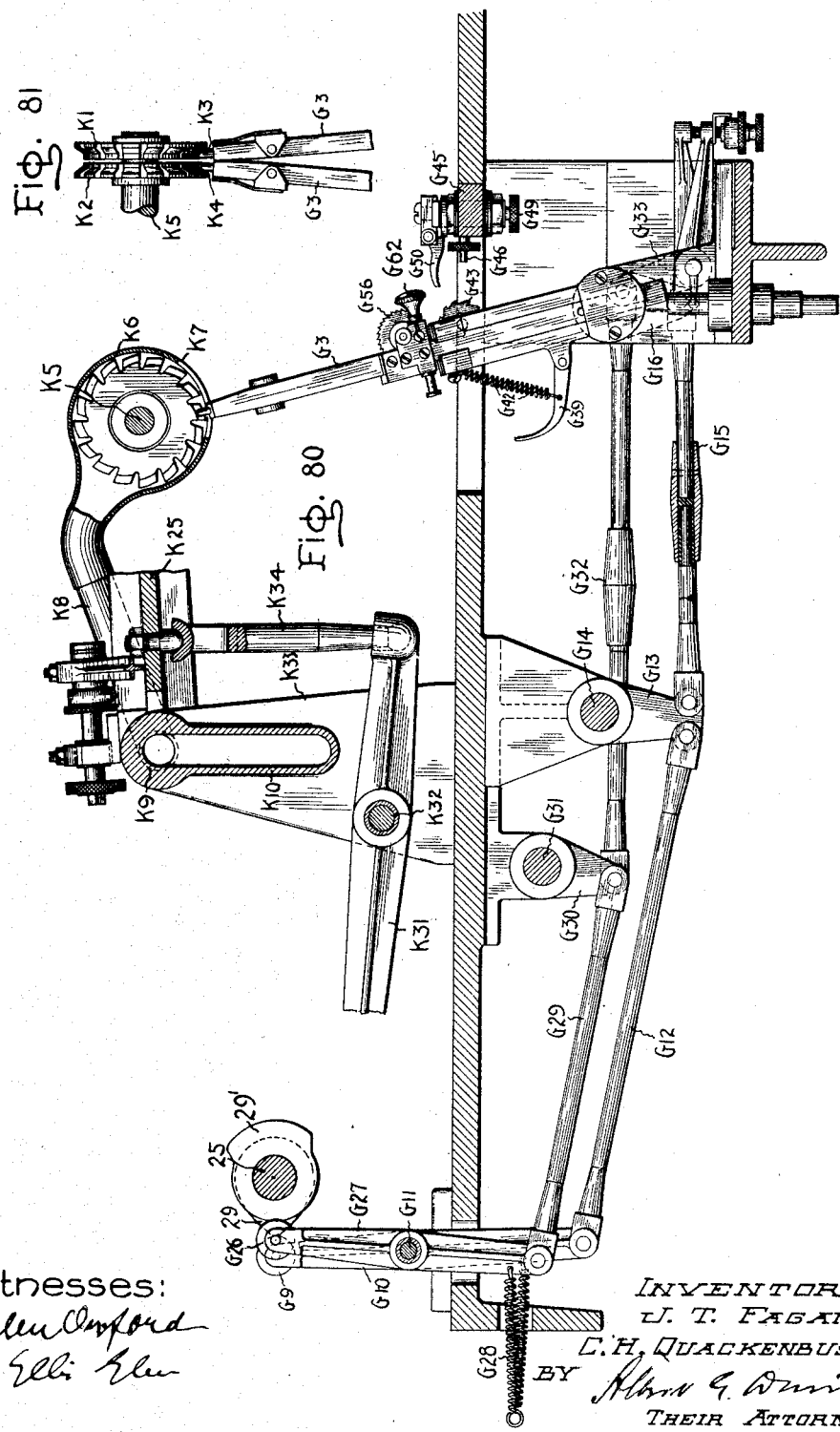

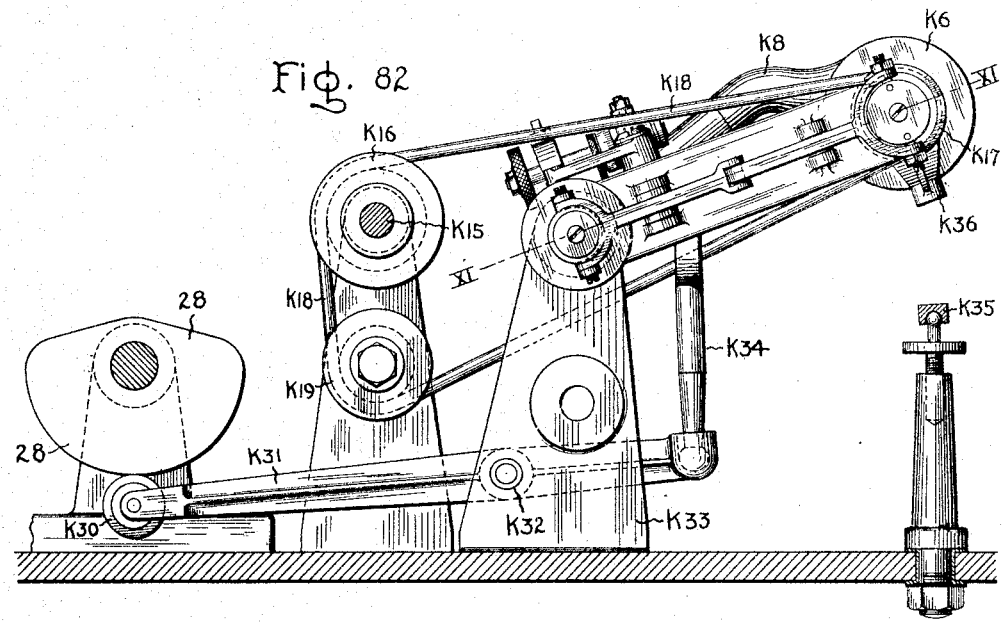
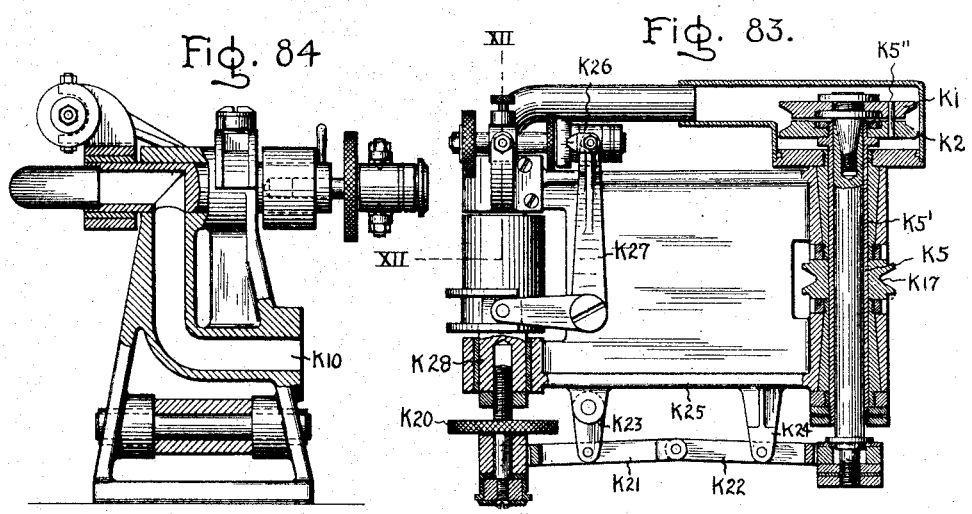
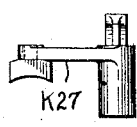

J. T. FAGAN & C. H. QUACKENBUSH.
WELDING MACHINE.
APPLICATION FILED JULY 27, 1914.
1,213,852. Patented Jan. 30, 1917.
23 SHEETS—SHEET 22.
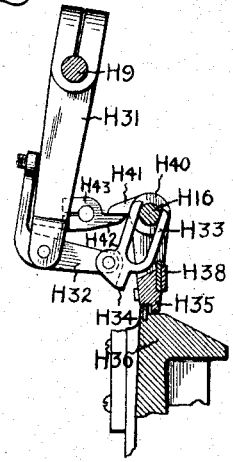
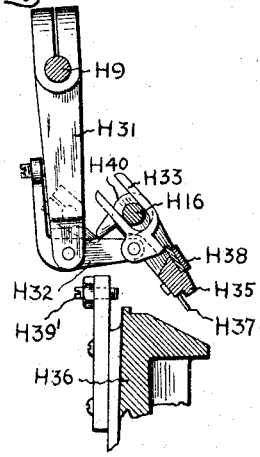
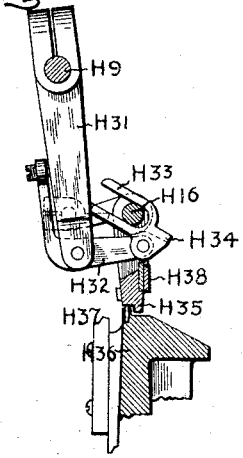
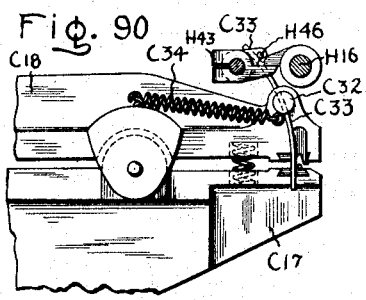
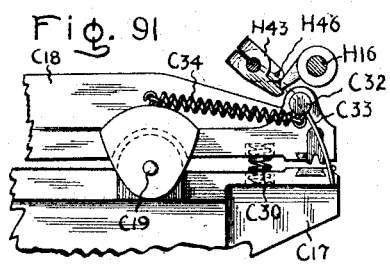
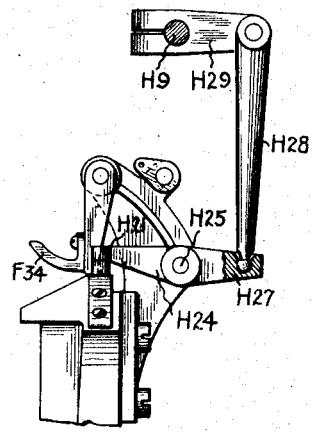
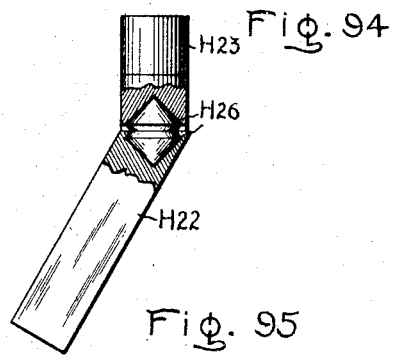
INVENTORS:
J. T. FAGAN,
C. H. QUACKENBUSH,
BY
THEIR ATTORNEY.

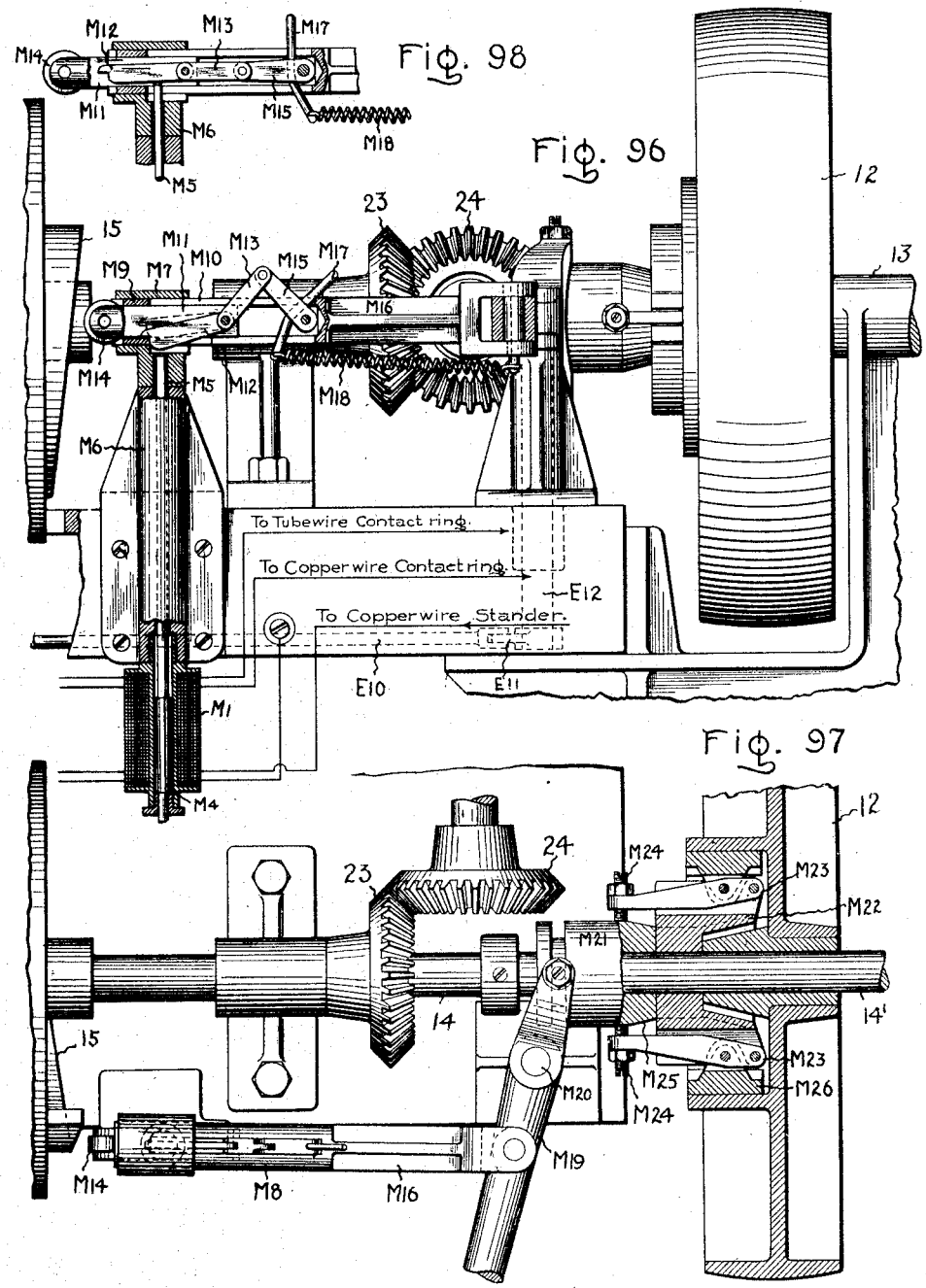

UNITED STATES PATENT OFFICE.

JOHN T. FAGAN AND CLEVELAND H. QUACKENBUSH, OF CLEVELAND, OHIO, ASSIGNORS TO GENERAL ELECTRIC COMPANY, A CORPORATION OF NEW YORK.

WELDING-MACHINE.

1,213,852.      Specification of Letters Patent.      Patented Jan. 30, 1917.

Application filed July 27, 1914. Serial No. 853,335.

*To all whom it may concern:*

Be it known that we, JOHN T. FAGAN and CLEVELAND H. QUACKENBUSH, citizens of the United States, residing at Cleveland, county of Cuyahoga, State of Ohio, have invented certain new and useful Improvements in Welding-Machines, of which the following is a specification.

This invention relates to a machine for welding together wires, rods and similar articles.

More particularly, this invention relates to a continuously operating automatic machine for uniting predetermined lengths of wire. In its preferred form the said machine comprises means for uniting three such lengths end to end and is entirely automatic and continuous in operation from the feeding of the wires from the reels or other holders to the discharge of the final product.

This invention is particularly adapted for use in the manufacture of leading-in wires for incandescent lamps. It is the practice to constitute said wires of two or more sections, of which one shall be platinum or a "platinum substitute," it being necessary to include a metal having such coefficient of expansion and other properties as to make an efficient seal with glass. In its broader aspect our invention is adapted to the manufacture of such leading-in wires in general, and more specifically considered, it is adapted to the manufacture of leading-in wires having the form disclosed in Fagan Patent No. 1,032,476, issued July 16, 1912.

It is desirable, in the interest of economy, to use a very short length of the platinum or substitute in the leading-in wire. In order to handle such lengths, a very nicely adjusted mechanism is necessary. Especially is this true in the production of leading-in wires like that disclosed in the Fagan patent above referred to. This requires not only that the portions of the wire be positioned with extreme accuracy, but that the means for fusing the wire be such that the fusion will be well localized. Our invention fulfils these requirements, and the leading-in wires produced thereby are practically uniformly free from irregularities at the welded portions.

In its preferred form, this invention comprises electrical means for effecting the weld, as the desired localization of applied heat is thus better obtained. However, it is to be understood that other heating means may be employed without departing from the scope of our invention.

The novel features of this invention are indicated in the claims.

The nature and advantages of the said invention will be more clearly understood by referring to the following description in connection with the accompanying drawings, which disclose one embodiment thereof. Throughout the description, the end wires, one of which is ordinarily long and the other short, are designated as copper wires, the shorter wire being also termed the "tube wire." It is to be understood that these wires may be of any desired metal. This is also true of the intermediate wire, which is designated as "platinum." The character of these metals does not affect the operation of the machine.

Figure 36:
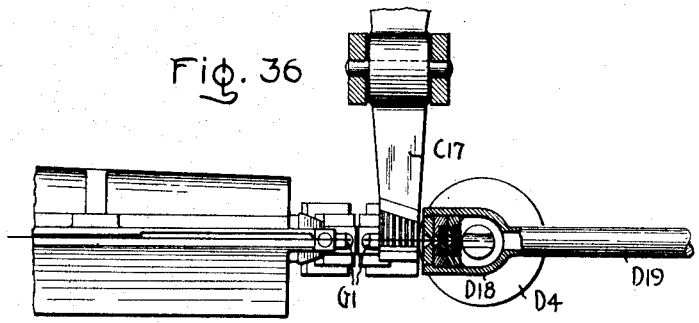
Figure 37:
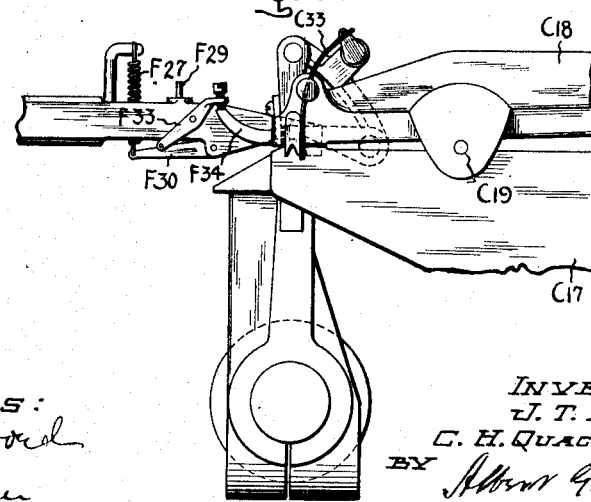
Figure 65:
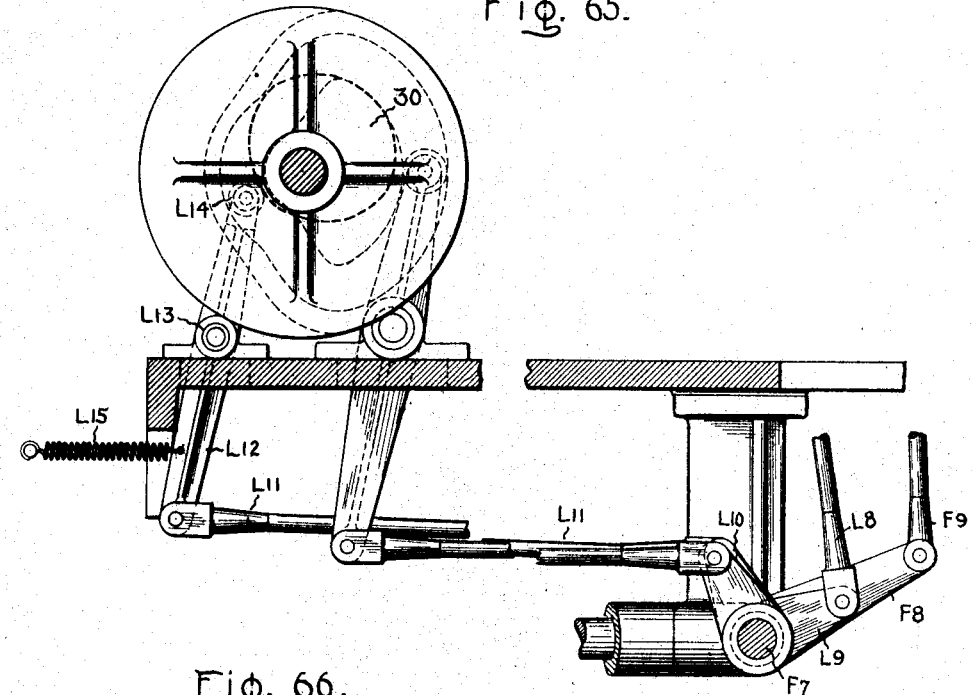
Figure 66:
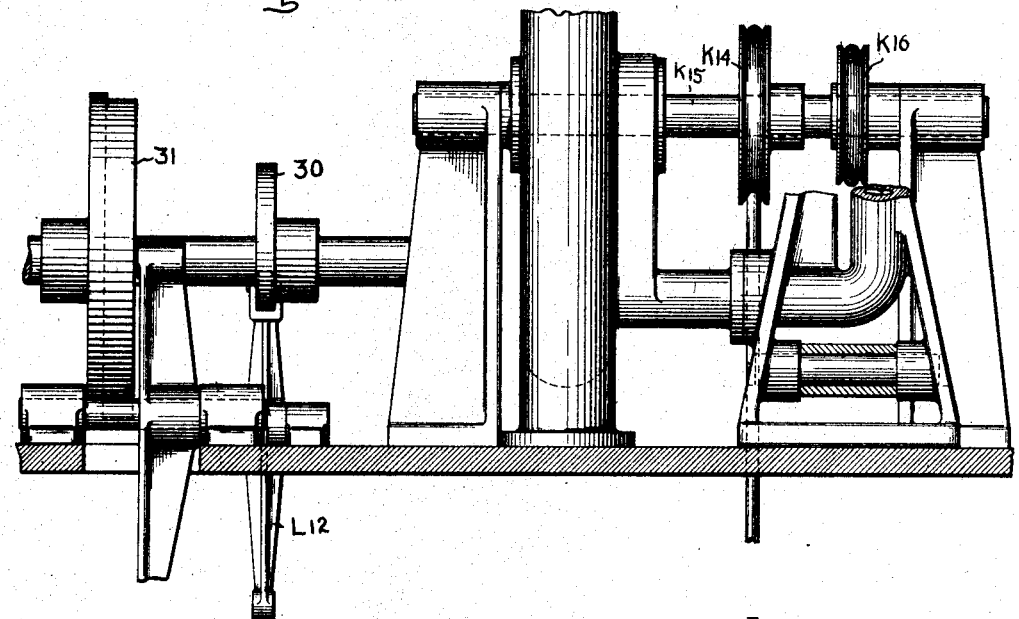

In the drawing, Figure 1 is a top plan view of the machine. Fig. 2 is a front elevation thereof. Fig. 3 is a sectional plan view showing various cams and operating levers and rods located below the bed-plate of the machine. Fig. 4 is a vertical elevation, partly in section, showing the mechanism for feeding, grooving and cutting the longer copper wire. Fig. 4' is an end view showing actuating parts of the final clamp for the longer copper wire. Fig. 5 is an end elevation of the movable punch and hammer for the longer copper wire. Fig. 6 is a similar view showing the punch in raised position. Fig. 6' is a similar view showing the same parts when they have reached their furthermost position to the right. Fig. 7 is an end elevation, partly in section, showing the stationary clamp of the long copper wire feed and operating mechanism therefor. Fig. 8 is a view in the opposite direction showing the cutter for the longer copper wire and the operating mechanism therefor. Fig. 9 is a partial side elevation showing the mechanism for discharging the completed weld, and related mechanism. Figs. 10, 11 and 12 are end elevations, partly in section, showing different positions of the said mechanisms. Fig. 12' is a detail elevation of a part of the said mechanism. Fig. 13 is a plan view of the said mechanism. Fig. 14 comprises diagrammatic plan views, and Fig. 15 sectional elevations of a portion of the lifting mechanism for the punch of the longer copper wire feed. Fig. 16 is a front elevation, and Fig. 17 is a partial sectional plan of the tube-forming die. Fig. 18 is a side elevation of the mechanism for feeding the shorter copper or tube wire. Fig. 19 is an end elevation of the said mechanism. Fig. 20 is a section on the line VI—VI of Fig. 18. Fig. 21 is a vertical section on the line VII—VII of Fig. 18. Fig. 22 is a vertical section, and Fig. 23 is a horizontal section showing the mechanism for actuating the movable member of the stationary clamp. Figs. 24, 25, 26, and 27 are detail views showing various positions of the mechanism for raising and lowering the punch forming part of the stationary clamp. Fig. 28 is a side elevation, partly in section. Fig. 29 is a plan view and Fig. 30 a front elevation of a portion of the tube wire transfer mechanism. Fig. 31 is a detail elevation of the tube transferring jaws. Fig. 32 is a bottom plan view of the upper jaw, and Fig. 33 is a top plan view of the lower jaw forming part of the same. Fig. 34 is a horizontal section on the line VIII—VIII of Fig. 30 showing the stops for the tube transfer mechanism. Fig. 35 is a partial assembly view in elevation showing relative positions of the tube forming hammer and die and other parts of the machine at the time of the formation of the tube. Fig. 36 is a plan view, partly in section, showing the same parts. Fig. 37 is a vertical elevation showing the relative positions of the tube wire jaws and the platinum finger at the same time. Fig. 38 is a side elevation showing the mechanism for forming the tube, in inoperative position. Fig. 39 is a side elevation showing the same elements in operative position. Fig. 40 is a side elevation of the platinum feeding mechanism. Fig. 41 is a sectional elevation, at right angles to Fig. 40, of the platinum heating apparatus. Fig. 42 is a plan view of a portion of the platinum feeding mechanism. Fig. 43 is an end view of the platinum feed and associated mechanism. Fig. 44 is a vertical section through the stationary clamp, and Fig. 45 a vertical section through the movable clamp forming part of the same. Figs. 46 and 47 are detail elevations showing the operation of the platinum cutter. Fig. 48 is a detail elevation showing part of the hammer mechanism. Fig. 49 is a section on the line IX—IX of Fig. 48. Figs. 50, 51 and 52 are details of the tube forming die and the adjustment therefor. Fig. 53 is a side elevation of the weld discharging and counting mechanism. Fig. 54 is an end view looking in the direction of the arrow in Fig. 53. Fig. 55 is a plan view of the counting mechanism. Fig. 56 is a detail showing the adjustable mounting of the platinum finger. Fig. 57 is an end view showing the wire discharging mechanism in section, and also the platinum transfer finger in discharging position. Fig. 58 shows the same when the finger is in receiving position. Fig. 59 is an end elevation looking in the opposite direction of the said parts. Figs. 60, 61, 62, 63 and 64 are details showing the platinum finger. Fig. 64' is a detail showing a part of the platinum finger and adjacent parts. Fig. 65 is an elevation showing the mechanism for turning the platinum finger and weld dumping mechanism. Fig. 66 is an elevation at right angles to Fig. 65 showing a portion of the exhausting mechanism for the cutter. Fig. 67 is an elevation, partly in section, showing the electrodes and mechanism for adjusting the position of the pencils thereof. Fig. 68 is an end elevation thereof. Fig. 69 is a longitudinal section through a portion of the pencil lifting mechanism. Figs. 70 and 71 are elevations, partly in section, of the pencil raising and adjusting mechanism. Fig. 72 is a similar view showing these parts in another position. Fig. 73 is a plan, partly in horizontal section, of the said parts. Fig. 74 is a front view of the stops for this portion of the mechanism. Fig. 75 is a side elevation showing the relation of these parts to the weld. Figs. 76 and 77 are details of portions of Fig. 75 on an enlarged scale. Fig. 78 is a section on the line XX—XX of Fig. 73. Fig. 79 is a section at right angles thereto. Fig. 80 is a side elevation partly in section, of a pencil cutter and mechanism for operating the same and for swinging the pencils to cutting position. Fig. 81 is a front view of the pencil ends and the cutters with the casing removed. Fig. 82 is a side elevation of the cutter. Fig. 83 is a section on the line XI—XI of Fig. 82. Fig. 84 is a section on the line XII—XII of Fig. 83. Figs. 85 and 86 show a detail of the adjustment for the cutters. Figs. 87, 88 and 89 are end elevations, partly in section, of details of the weld discharging mechanism in various positions. Figs. 90 and 91 are sectional elevations of the tube wire jaws in different positions showing the discharging of the weld. Fig. 92 is a sectional elevation showing the clamp for the long copper wire and other related mechanism. Figs. 93, 94 and 95 are detail views showing the aforesaid clamp. Fig. 96 is a side elevation of the mechanism for operating the clutch. Fig. 97 is a plan view thereof, partly in section. Fig. 98 is a vertical section of a portion of this mechanism in another position.

The operation of the machine, stated generally, is as follows: Referring to Figs. 1 and 2, the longer copper wire is carried on the reel 10 and is passed through tension and straightening mechanism to the feeding, grooving and cutting mechanism A.

Simultaneously the shorter copper or tube wire, which is carried on the reel 11, passes through tension and straightening devices and then through feeding, grooving and cutting mechanism B. Each short length is transferred by mechanism C to a position such that the grooved end thereof is accurately positioned relatively to the grooved end of the longer copper wire. Practically simultaneously with the reaching of the welding position by the shorter copper wire, mechanism D operates upon the other end thereof to shape it into a tube. Meanwhile the platinum wire has passed through straightening, feeding and cutting mechanism E and a piece thereof is transferred by mechanism F so that its ends rest in the aforesaid grooves. Welding electrodes, comprised by the mechanism G, are then swung into position so that their ends contact with the grooved ends of the copper wire. The electric current passing through the contact parts is such as to cause the copper to fuse and to embed the ends of the platinum wire. Various clamping and ejecting mechanism H operates just previous to the weld and immediately thereafter. Owing to the fact that the ends of the electrodes are eaten away during the welding operation, it is necessary to periodically trim the same by means of the cutter K. A collecting and counting mechanism L takes care of the welds after they are ejected. A clutch mechanism M is provided to stop the operation of the machine when the wires become tangled or twisted.

Motive power is transmitted to the machine through the pulley 12 mounted on the shaft 13. The said shaft is connected by the safety clutch M to the shaft 14, which carries the cam 15, operating the tube forming die mechanism. Meshing with the gear 16 on the said shaft is a gear 17 fast to a shaft carrying the cam disk 18, which operates the tube transfer mechanism C. The shaft 14 also carries the cam 19, which operates the hammer and anvil of the tube forming mechanism and the cams 20 and 21, which operate the platinum wire feed. The handwheel 22 is mounted on the shaft 14 for convenience in actuating the various mechanisms when the safety clutch has been thrown out. Meshing with the beveled pinion 23 on the shaft 14 is the beveled pinion 24 on the shaft 25. The shaft 25 carries the cams 26 and 26' for operating the short copper wire feed and cutters, the cam 27 for operating the lock for the tube wire transfer mechanism, the cam 27' for opening and closing the gripper of said mechanism, the cam 28 for lifting and lowering the cutter, the cams 29 and 29' for turning and lifting respectively the electrode pencils, the cam 30 for operating the weld collecting mechanism, and the cam 31 for operating the platinum transferring mechanism. The shaft 25 carries at the end thereof the beveled pinion 32 meshing with the pinion 33 on the shaft 34. The shaft 34 carries the disk 35, which operates the copper feed mechanism A and other mechanism connected therewith.

*The feed for longer copper wire.*—Referring to Figs. 1, 2, 4 to 8 inclusive, 14 and 15, it will be seen that the copper wire is carried on reel 10 and passes through the tension roller $A^1$ to the straightening rollers $A^2$, $A^3$, and $A^4$, which are of a character well known to the art. The feed mechanism for this copper wire comprises movable clamp $A^5$ and stationary clamp $A^6$. The clamp $A^5$ also contains a punch mechanism for forming a groove in the wire. The mechanism $A^5$ is carried by a cross-head $A^7$ and is reciprocated upon the ways $A^8$ by the connecting rod $A^9$, which is operated by the disk 35. Mechanism $A^5$ comprises the passage $A^{10}$ through which the wire extends, and the casings $A^{11}$ and $A^{12}$ which contain springs $A^{13}$ and $A^{14}$ respectively, the former bearing against the movable member $A^{15}$ of the wire clamp, and the latter against the head $A^{16}$ carrying a punch $A^{17}$, which projects through the movable clamp member $A^{15}$. The movable clamp comprises also the stationary member or anvil $A^{18}$. The movable member $A^{15}$ is attached to the fork $A^{19}$ by pins which pass through a slot in the casing $A^{11}$. The said fork is mounted on the rod $A^{20}$, which carries the roller $A^{21}$ running on a track $A^{22}$ as the collar $A^7$ is reciprocated back and forward. The track $A^{22}$ is mounted upon a stud $A^{23}$ passing through a sleeve $A^{24}$ which is attached to the bed $A^{25}$ of the machine. The stud $A^{23}$ is movable in the sleeve $A^{24}$ against the action of springs $A^{27}$ by the lever $A^{28}$, which is connected to an arm $A^{29}$ pivoted to the disk 35. The lever $A^{28}$ is fulcrumed at $A^{30}$ and carries a bearing $A^{31}$ forming part of a ball and socket joint with the thrust-rod $A^{32}$, the other end of which bears against the stud $A^{23}$.

The head $A^{16}$ holding the punch $A^{17}$ is carried by the sleeve $A^{33}$, the lower surface of which is helical in shape, and which in its lowest position fits with the upper surface of a lower sleeve $A^{34}$ resting upon the pinion $A^{35}$. The latter is engaged by the stationary rack $A^{36}$, as shown in Fig. 14, which causes it to rotate as the head $A^7$ is reciprocated. As shown in Fig. 15, the pinion $A^{35}$ has a slot in the upper face thereof which has a helical bottom $A^{37}$. The lower end of pin $A^{38}$ rests on the said surface, the said pin being spring pressed in aperture $A^{39}$ at the bottom of sleeve $A^{34}$. The sleeve $A^{33}$ carrying the punch is raised during the travel of the clamp from its extreme position to the left to approximately two-thirds of the distance to the right.

This is accomplished by reason of the fact that the pin $A^{38}$ is engaged by the shoulder $A^{39'}$, shown in Fig. 15. During the rest of the travel to the right the sleeve $A^{33}$ continues to be raised so that the end of the punch will clear the wire, as shown in Fig. 6'. A spring pressed pin $A^{39''}$ carried by the sleeve $A^{33}$ then engages the shoulder on the sleeve $A^{34}$ and serves to hold the latter stationary, thus preventing it from being turned by friction with the pinion $A^{35}$ during the return movement to the left. During the said return movement the sleeves remain stationary and the pin $A^{38}$ travels on the helical surface $A^{37}$ and is gradually raised until the limiting position to the left has been reached, it then drops behind the shoulder $A^{39'}$ and upon the next movement to the right the parts are operated as before described, the punch being elevated gradually until the proper point is reached when it drops as before, after which it is again slightly elevated as the parts reach the end of the stroke to the right. The sleeve $A^{33}$ carries a guide $A^{40}$ which slides upon the pin $A^{41}$ depending from a bracket supported by the casing $A^{12}$. The punch $A^{17}$ has a chisel end and engages a corresponding groove in the anvil $A^{18}$.

Stationary clamp $A^6$ comprises a lower stationary member $A^{42}$ and an upper movable member $A^{43}$. This portion of the apparatus carries a guide $A^{44}$ having suitable aperture through which the wire passes. Movable member $A^{43}$ is raised against the spring $A^{45}$ by a rod $A^{46}$ which rests in the adjustable bearing $A^{47}$ on lever $A^{28}$. The rod $A^{46}$ is attached to the movable member $A^{43}$ by means of a pin $A^{48}$ which works in a slot in the casing of $A^6$. Upon the same standard with the stationary clamp $A^6$ is mounted the cutting mechanism for the longer copper wire. This comprises a guide having aperture $A^{49}$ in line with $A^{44}$ and the reciprocatable head $A^{50}$, to which is removably secured the knife $A^{51}$. The head $A^{50}$ works in slot $A^{52}$ and is actuated by the rods $A^{53}$ which are pivoted to one arm of the lever $A^{54}$ fulcrumed at $A^{55}$ and having its outer end attached to the track $A^{22}$.

It will be seen that when the movable clamp assumes its limiting position to the left the member $A^{15}$ is depressed, thus gripping the wire. As the said clamp moves to the right it carries the wire with it, and when it reaches its limiting position the member $A^{15}$ is raised to release the wire. Simultaneously the stationary clamp member $A^{43}$ is depressed to grip the wire. During its travel the wire has been grooved, and when this groove reaches the end aperture $A^{49}$ the knife $A^{51}$ cuts the wire at this point leaving the groove at the forward end of the next piece.

*Mechanism for feeding the shorter copper wire and performing necessary operations thereon.*—Referring to Figs. 1, 2, 3 and 18 to 27 inclusive, it will be seen that the wire for the shorter copper wire is carried by reel 11 and is fed through the straightening devices $B^1$ and $B^2$ to the feed mechanism $B^3$. The latter comprises a stationary clamp and punch $B^4$ and a movable clamp $B^5$ and is mounted upon a cross-head $B^6$ which slides upon the ways $B^7$, being actuated by the cam 26 in a slot of which rests the roller $B^8$ carried by the said cross-head. The movable clamp $B^5$ comprises the lower stationary member $B^9$ and the upper movable member $B^{10}$ which acts against the adjustable spring $B^{11}$. The movable member is attached by means of a pin $B^{12}$ passing through a slot in the casing to a collar $B^{13}$ which is pivoted to the casing at $B^{14}$, and which carries at the opposite side a roller $B^{15}$ which is adjustably supported thereby. The said roller runs on a track $B^{16}$. The said track is slotted at each end thereof and is supported by pins $B^{17}$ and $B^{18}$ passing through said slots. The track $B^{16}$ is pivotally connected to one end of a rod $B^{19}$, the other end of which is pivoted to the arm $B^{20}$ which is rigidly mounted upon the shaft $B^{21}$. This shaft has also rigidly attached thereto the arm $B^{22}$, the end of which is pivoted to the rod $B^{23}$, the other end of the latter being pivoted to the lever $B^{24}$ fulcrumed at $B^{25}$ to the bed of the machine and carrying the roller $B^{26}$ engaging the cam $B^{27}$ on the shaft 25. The movement of the rod $B^{23}$ to the right (Fig. 18) compresses the spring $B^{28}$ against guide $B^{28'}$. It will be apparent that the track $B^{16}$ is raised and lowered through the reciprocation of the movable clamp thus causing the member $B^{10}$ to be raised and lowered to grip and release the wire. The stationary clamp is composed of casings $B^{29}$ and $B^{30}$. Within the casing $B^{29}$ is located a clamp consisting of a movable member $B^{31}$ and the stationary member $B^{32}$. The member $B^{31}$ is raised against the spring $B^{33}$ by a cam $B^{34}$ on shaft $B^{21}$ which engages the lug $B^{35}$ loosely mounted on shaft $B^{36}$ and engaging an adjustable stop $B^{37}$ carried by one of cranks $B^{38}$ fast to shaft $B^{36}$. The cranks $B^{38}$ also carry the pin $B^{39}$ engaging $B^{31}$ through slots in casing $B^{29}$. The punch $B^{41}$ has a chisel end engaging with a correspondingly shaped groove in the upper surface of the anvil $B^{32}$. The said punch passes through the member $B^{31}$ and is attached to a head $B^{42}$ which is raised and lowered against the action of the adjustable spring $B^{43}$. To this end, the head $B^{42}$ is attached to a sleeve $B^{44}$ by a pin passing through a slot in casing $B^{30}$. The said sleeve carries a guide $B^{45}$ sleeved on pin $B^{46}$ attached to said casing by clamp $B^{47}$. The lower surface of the sleeve $B^{44}$ is helical in shape and the upper surface of the lower sleeve $B^{48}$ shaped so as to fit therewith. The sleeve $B^{48}$ is rotatable and for this purpose has attached thereto the driving pinions $B^{49}$ and $B^{50}$. These are engaged respectively by the movable racks $B^{51}$ and $B^{52}$. The said racks are adapted to turn the sleeve $B^{48}$ always in the same direction. The pinion $B^{49}$ carries the spring-pressed pin $B^{53}$, while the pinion $B^{50}$ carries the spring-pressed pin $B^{54}$. The pin $B^{53}$ is adapted to engage at different times shoulders $B^{55}$ and $B^{56}$, which are formed by eccentric slots on the sleeve $B^{48}$. The pin $B^{54}$ is adapted to engage the shoulders $B^{57}$ and $B^{58}$, which are also formed by eccentric slots on the sleeve $B^{48}$. The rack $B^{51}$ engages with the pinion carrying the pin $B^{53}$, while the rack $B^{52}$ engages with the pinion carrying pin $B^{54}$. As the said racks advance from the position shown in Fig. 25 to that shown in Fig. 27 the pin $B^{53}$ will cause the sleeve $B^{48}$ to turn. At the same time the pin $B^{54}$ will be forced back until it reaches the shoulder $B^{57}$ when it will be forced into the slot to engage the said shoulder. Upon the return movement of the racks from the position shown in Fig. 27 to that shown in Fig. 25 the pin $B^{54}$ will drive the sleeve $B^{48}$ in the same direction as before, while the pin $B^{53}$ will be forced back and will be ready to engage the shoulder $B^{56}$ upon the next advance of the racks. The position of the racks and pinions shown in Fig. 25 corresponds to the position of the sleeves shown in Fig. 24, while those in Fig. 27 correspond to those in Fig. 26. Fig. 26 shows the upper sleeve in its raised position just prior to its drop with the punch $B^{41}$.

The cutting mechanism for the short wire comprises the knife $B^{59}$ mounted upon the holder $B^{60}$ and pivoted at one end to the standard $B^{60'}$. The other end of the said holder is pivotally connected to the arm $B^{61}$ which is mounted upon the shaft $B^{21}$ and is actuated thereby, its position being governed by the cam $B^{27}$.

*Tube wire transferring mechanism.*—The tube wire transferring mechanism, as shown in Figs. 3 and 28 to 34 inclusive, is turned by the cam 18 having a slot $C^1$ which engages the roller $C^2$ carried by the pivoted arm $C^3$. Pivotally carried by the said arm is the rod $C^4$ which is pivotally connected at the other end thereof to the arm $C^5$, which is secured to a collar on the hollow shaft $C^6$ which extends up through the bed-plate of the machine. Stops are provided as hereinafter described for limiting the rotation of the shaft $C^6$ in either direction independently of the cam 18. To this end, the rod $C^4$ carries sleeves $C^7$ and $C^8$ which slide upon the rod $C^9$, which is pivoted to the link $C^{10}$, which is in turn pivoted to the arm $C^5$. A sleeve $C^{11}$ is mounted upon the rod $C^9$ and slides upon the rod $C^4$. The helical springs $C^{12}$ and $C^{13}$ are mounted on the rod $C^4$ and are compressed in turn between the sleeves $C^{11}$ and $C^7$ and sleeve $C^{11}$ and $C^8$ respectively. As shown in Fig. 28, the hollow shaft $C^6$ carries at the upper end thereof the tube wire gripping mechanism $C^{14}$. For the purpose of reducing friction, roller bearings $C^{15}$ contained within the casing $C^{16}$ are provided for the shaft $C^6$. The wire gripping mechanism is composed of a lower jaw $C^{17}$ and an upper jaw $C^{18}$ which is pivoted thereto at $C^{19}$ and is movable relatively thereto by means of the jointed rod $C^{20}$ which extends through the hollow shaft $C^6$ and is supported at its lower end by a ball and socket joint $C^{21}$ upon a bracket $C^{22}$. A horizontally extending arm $C^{23}$ is pivoted to a ball race $C^{24}$ which forms part of an antifriction bearing $C^{25}$ for the rod $C^{20}$. The guide-pin $C^{26}$ extends downwardly from the bed of the machine through arm $C^{23}$. The arm $C^{23}$ is pivotally connected to a lever $C^{27}$ fulcrumed on the shaft $C^{28}$, and the other end of which carries a roller $C^{29}$ which is engaged by the cam 27'. The oscillations of the lever $C^{27}$ through arm $C^{23}$ cause the rod $C^{20}$ to be buckled and straightened, there being a ball and socket joint in said rod in line with said arm. This causes the movable jaw $C^{18}$ to be raised and lowered at the proper times. As shown in Figs. 31 to 33 inclusive, a strong spring $C^{30}$ is mounted between the jaws $C^{17}$ and $C^{18}$ and serves to separate the said jaws when the rod $C^{20}$ is buckled. The end of the movable jaw $C^{18}$ carries a grooved insert and centering plates $C^{31}$ on each side for holding and lining up the wire after its reception from feed mechanism B. The upper and lower jaws are shown in plan in Figs. 32 and 33. The upper jaw carries a means for assisting in the ejection of the completed weld. This comprises a swiveled holder $C^{32}$ which carries the pins $C^{33}$ extending adjacent to the sides of the jaws and one of which extends upwardly so as to be engaged by a pin $H^{46}$ which will be described hereinafter. A tension spring $C^{34}$ is attached to $C^{32}$ and to the movable jaw to return $C^{33}$ to stop pin $C^{34'}$ after the ejection of the weld. The plate $C^{35}$ attached to the lower jaw has a vertical rib $C^{36}$ carrying the adjustable pin $C^{37}$ adapted to strike against the stop $C^{38}$ carried by the sleeve $C^{39}$ which is supported upon the bed-plate so as to accurately position the tube wire in welding position. The rib $C^{36}$ also carries the adjustable pin $C^{40}$. A locking stud $C^{41}$ is raised so as to engage the pin $C^{40}$ when welding position is reached. This braces the mechanism against the pull by the tube forming die and also assists in accurately positioning the tube wire for welding. The said locking stud is carried in a sleeve $C^{42}$ mounted on the bed of the machine and is raised and lowered by the arm $C^{43}$, fulcrumed at $C^{44}$ and carrying a roller $C^{45}$ in a slot of the cam 27. The plate $C^{35}$ also has a rib $C^{46}$ carrying the adjustable pin $C^{47}$ which engages the stop $C^{38}$ when the transferring mechanism is in position to receive the tube wire.

It will be apparent that the above described mechanism receives the shorter copper wire and gripping the same in proper position swings it into properly spaced relation with the end of the longer copper wire. This mechanism retains its grip upon the wire until after the tube forming and welding operations, when it releases the same and returns for another length.

*The tube forming mechanism for the smaller copper wire.*—Referring to Figs. 38 and 39, it will be seen that the mechanism for forming the tube comprises the hammer $D^1$ and anvil $D^2$, which are adjustably and removably mounted in the holders $D^3$, $D^4$ formed in the ends of bell-crank levers $D^5$, $D^6$, respectively, which are pivotally mounted on shaft $D^7$ mounted on standards $D^8$. To the other ends of the said cranks are pivotally attached the levers $D^9$ and $D^{10}$ respectively, which are both pivotally held at $D^{11}$ to the lever $D^{12}$ pivoted at $D^{13}$ to the bed-plate of the machine. The lever $D^{12}$ carries the adjustable roller $D^{13'}$ which contacts with the actuating cam 19 mounted on shaft 14. As shown in Figs. 48 and 49, a spring $D^{14}$ is connected at one end on shaft $D^7$ to the bell-crank $D^5$ and at the other end to bell-crank $D^6$. A pawl and ratchet device $D^{15}$ is provided for regulating the tension of the spring. It will be seen that the spring $D^{14}$ tends to force the hammer and anvil together and to hold the roller $D^{13'}$ against the cam.

The tube forming die $D^{16}$ is shown in detail in Figs. 16 and 17 and consists of the removable die members $D^{17}$ and guide $D^{17'}$ mounted in the yoke-shaped holder $D^{18}$, integral with rod $D^{19}$. The latter is adjustably and removably supported in a holder $D^{20}$, as shown in Figs. 38, 39 and 50. The holder, as shown in Figs. 50 and 51, is pivoted at $D^{21}$ and $D^{22}$ on an anti-friction bearing $D^{23}$ adjustably held by the fork $D^{24}$ collared on shaft $D^{25}$. The latter is supported in bearings $D^{26}$, $D^{27}$, on standards $D^8$, and is adjustable laterally by means of the micrometer adjustment $D^{28}$, shown in section in Fig. 52. The actuating mechanism for the die causes the same to be first lowered and then advanced horizontally over the end of the tube wire. The hammer and anvil then assume such position that they pass through the slot in $D^{18}$, as shown in Fig. 39, and form a groove in the end of the wire after which the hammer and anvil are separated as shown in Fig. 38. Practically simultaneously therewith, the die is retracted horizontally and then raised to the position shown in Fig. 38, so that it will clear the tube transferring and other mechanism. The mechanism for the die comprises the cam 15, the slot $D^{29}$ of which contains the roller $D^{30}$ at the end of arm $D^{31}$ collared on shaft $D^{32}$ held in bearings on standards $D^{33}$ and $D^8$. The arm $D^{34}$ is also collared on said shaft and has pivoted thereto at its forked end the arm $D^{35}$ which, as shown in Fig. 50, passes through the fork $D^{24}$ and is pivoted at $D^{36}$ on the bearing $D^{23}$ for the die rod holder, as shown in Figs. 50 and 51. It has a forwardly projecting adjustable stop $D^{37}$ which supports the die holder in its lowest position and during its advance and retraction. The fork $D^{24}$, as heretofore described is pivoted on shaft $D^{25}$ and holds the bearing for the die holder. The cam slot $D^{29}$ is so shaped that the die is moved forward at the proper time, pauses long enough for the hammer to operate and is then retracted. In order to raise the die a pair of contacts $D^{38}$ are provided on forwardly extending lugs $D^{39}$ on fork $D^{24}$. These engage with adjustable stops $D^{40}$ on the die holding member and cause the same to be raised about shaft $D^{25}$ as a center just before the parts reach the position shown in Fig. 38. Upon the next forward movement the stop $D^{39}$ swings out of the way and allows the die holder to rest on stop $D^{37}$ after which it is advanced horizontally.

*The platinum straightening, feeding and cutting mechanism.*—This mechanism is shown principally in Figs. 40 to 47 inclusive. The platinum wire is carried by the reel $E^1$ and extends through the straightener $E^2$ to the heater $E^3$. The purpose of the latter is to anneal the wire so as to assist in straightening it, and comprises a casing $E^4$ within which extends the gas burner $E^5$. Means are provided for moving the burner to one side of the casing, as shown in Fig. 41, upon the stoppage of the platinum wire. This is accomplished by means of the lever $E^6$ pivoted to rod $E^7$, which in turn is pivoted to an arm $E^8$, shown in Fig. 3, attached to a sleeve on the shaft $E^9$ supported by the bed of the machine. Also attached to the said shaft is a rod $E^{10}$ pivoted to an arm $E^{11}$, which is fast to the stud $E^{12}$. As shown in Fig. 96, the stud $E^{12}$ forms part of the operating mechanism of the clutch. It will be apparent, therefore, that when the clutch is thrown out the burner $E^5$ is pushed over against the side of the casing $E^4$ and out of line with the platinum wire. The mechanism for feeding the platinum wire consists of the stationary clamp $E^{13}$ and the movable clamp $E^{14}$. The clamps are provided with upper adjustable and removable stationary jaws $E^{15}$ and lower movable jaws $E^{16}$. The lower jaws are movable downwardly against the spring $E^{17}$. Each of the jaws $E^{16}$ is apertured to receive the end of the arm $E^{18}$ which is fast to the shaft $E^{19}$. The said shaft $E^{19}$ also has fast thereto the forks $E^{20}$ carrying a roller $E^{21}$. Spring $E^{22}$ extends between the forks $E^{20}$ and ears $E^{23}$ which are stationary. The roller $E^{21}$ of the stationary clamp is actuated by a cam $E^{24}$ mounted on shaft $E^{25}$, which also carries the cam $E^{26}$ actuating the roller $E^{21}$ of the movable clamp. The shaft $E^{25}$ is actuated through the arm $E^{27}$ attached to the rod $E^{28}$ which is carried by the lever $E^{29}$ fulcrumed at $E^{30}$ to a bracket on the machine. The other end of the said lever is pivotally connected by the rod $E^{31}$ to the bell-crank $E^{32}$ which is pivotally connected to the rod $E^{33}$ carried by the lever $E^{34}$ fulcrumed at $E^{35}$ to the machine and carrying at its other end a roller $E^{36}$ which is actuated by cam 21. The cams $E^{24}$ and $E^{26}$ of the respective clamps are so mounted that when the stationary clamp is closed the movable clamp is open. The movable clamp is mounted upon the plate $E^{37}$ which slides in the stationary plate $E^{38}$. A spring $E^{39}$, shown in Fig. 42, is attached at one end to the plate $E^{37}$ and at the other to a stationary part of the machine. The reciprocation of the plate $E^{37}$ is secured by means of the rod $E^{40}$ which is pivotally connected thereto at one end and at the other end to one end of the bell-crank $E^{41}$. To the other end of the said bell-crank is connected by a ball and socket joint a rod $E^{42}$, which is connected by a ball and socket joint to the lever $E^{43}$, which is fulcrumed at $E^{30}$. The other end of the lever $E^{43}$ is pivotally connected by means of the rod $E^{44}$ to one end of the bell-crank $E^{45}$ to which is pivotally connected the rod $E^{46}$ attached to one end of the lever $E^{47}$ which is fulcrumed at $E^{35}$ on the bed of the machine. A roller $E^{48}$ mounted at the other end of the said lever engages the cam 20. The opening and closing of the jaws of the two clamps is so timed that when the plate is moved to the left the jaws of the stationary clamp are open while the jaws of the movable clamp are closed and vice versa upon the movement to the right.

The mechanism for cutting the platinum wire, as shown in Figs. 43, 46 and 47, comprises the knife $E^{49}$ which contacts with the die $E^{50}$ at the end of the feed aperture. The said knife is mounted at one end of the bell-crank $E^{51}$, which is mounted on shaft $E^{52}$ carrying the lug $E^{53}$ to which is attached spring $E^{54}$, the same being held at its other end by stationary lug $E^{55}$. The lower end $E^{56}$ of the bell-crank $E^{51}$ is in position to be engaged by the ratchet wheel $E^{57}$ which is loosely mounted on shaft $E^{25}$ and which has alternate deep and shallow notches. A spring pressed pawl $E^{58}$ is pivotally mounted on an arm $E^{59}$ collared on shaft $E^{25}$. As the said shaft is turned so that the parts assume the positions shown in Fig. 47, crank-end $E^{56}$ is depressed against the action of spring $E^{54}$ until it reaches the next deep notch when it flies upwardly, thus causing a sharp movement of the knife $E^{49}$ to the left. The rotation continues until the next shallow notch is reached and $E^{56}$ drops into the same and serves to prevent the rotation of $E^{57}$ in the opposite direction. As the shaft $E^{25}$ is turned in the opposite direction the pawl $E^{58}$ rides over the wheel $E^{57}$ to another deep notch.

*Platinum transfer mechanism.*—The platinum transfer mechanism, as shown in Figs. 57 to 60 inclusive, comprises the finger $F^1$, which is held by arm $F^2$ mounted on shaft $F^3$ which, as shown in Figs. 53 and 56 is capable of lateral adjustment. The turning means for the shaft $F^3$ and attached parts comprises the cam 31 which, as shown in Figs. 1 and 3, acts through the rod $F^4$ pivoted to the crank $F^5$ fast to a collar $F^6$ near the end of shaft $F^7$. The shaft $F^7$ has fast thereto the arm $F^8$, the other end of which is pivotally connected to the vertical rod $F^9$, whose other end is pivoted at $F^{10}$ to the arm $F^{11}$ fast to shaft $F^3$. The arm $F^{11}$ carries stop $F^{12}$ which engages the stationary stop $F^{13}$, carried on the standard supporting shaft $F^3$ and provided with the micrometer adjustment $F^{14}$, when the finger $F^1$ is in discharge position as shown in Fig. 57. When the said finger is in receiving position as shown in Fig. 58, the stop $F^{12}$ engages an adjustable stop $F^{15}$ also carried by the aforesaid standard. The means coacting with the aforesaid stops to regulate the throw are similar to the means provided in connection with the tube transferring mechanism, and comprises the rod $F^{16}$ pivoted to the arm $F^{11}$ and carrying sleeve $F^{17}$, which slides upon the rod $F^9$. On the rod $F^9$, between the sleeve $F^{17}$ and sleeves $F^{18}$ $F^{19}$, respectively, which extend over and slide upon the rod $F^{16}$, are located the springs $F^{20}$ and $F^{21}$. When the platinum finger is in receiving position, the spring $F^{20}$ is compressed between $F^{17}$ and $F^{18}$. When the platinum finger is in the discharging position, the spring $F^{21}$ is in compression between $F^{17}$ and $F^{19}$. Fulcrumed at $F^{24}$ to the member $F^{22}$ is the movable jaw carrying member $F^{25}$ which has mounted in the end thereof jaw $F^{26}$. The other end of the member $F^{25}$ is connected by spring $F^{27}$ to a pin $F^{28}$ carried by the member $F^{22}$. A spring compressed pin $F^{29}$ is slidably mounted in the member $F^{22}$ and contacts with the end $F^{30}$ of the member $F^{25}$. When the finger reaches the platinum receiving position the said pin contacts with a lug $F^{31}$, which, as shown in Figs. 46 and 47, is mounted on the shaft $E^{25}$ thus opening the jaws of the platinum finger. As shown in Fig. 64, when the platinum finger is in discharging position, the adjustable stop $F^{32}$ carried at the end of the pivoted lever $F^{33}$ is engaged by lug $F^{34}$ of a tripping mechanism hereinafter described, and this forces the end $F^{30}$ of the member $F^{25}$ downwardly to open the aforesaid jaws. The spring $F^{27}$ serves to close the jaws in each instance.

The manner in which the piece of platinum is held by the finger is shown in Fig. 64', which shows the jaw $F^{26}$ in plan. This jaw is grooved in two directions, the one groove engaging the platinum wire and the other the other jaw member or pin $F^{26'}$. Owing to the form of the jaws, the pressure exerted thereby bends the platinum wire to the position shown with its ends depressed. This causes the said ends to make good contact with the grooves at the ends of the copper wires.

*Welding electrodes and operating and adjusting mechanism therefor.*—Referring to Figs. 2, 3 and 67 to 81 inclusive, it will be seen that the electrodes are two in number and consist of pencils $G^1$, preferably of graphite. The said pencils are removably held by holders $G^2$, each of which is movable within a casing $G^3$ which is slidably held by the sleeve $G^4$ fast to the end of the shaft $G^5$. The shaft $G^5$ turns against the action of spring $G^6$, the ends of which are held by the adjustable collar $G^7$ and the collar $G^8$ respectively. The mechanism for turning the electrodes into position for the welding and trimming operations, respectively, comprises the cam 29, which acts against roller $G^9$ at the end of lever $G^{10}$ fulcrumed at $G^{11}$ and having its other end pivotally connected to the rod $G^{12}$. The latter is pivotally connected to the arm $G^{13}$ which is pivotally mounted on the shaft $G^{14}$ carried by the frame of the machine. Also pivotally attached to $G^{13}$ is the insulated rod $G^{15}$, which is pivotally attached to the crank $G^{16}$ having a collar $G^{17}$ fast to the shaft $G^5$.

When the electrode pencils are turned to welding position they are lifted so that their ends will contact with the grooved ends of the copper wires, as shown in Fig. 64'. As shown particularly in Figs. 67 and 68, the block $G^{18}$ carried at the end of the slidable casing $G^3$ abuts against the end of the rod $G^{19}$ which is slidable within the sleeve $G^{20}$, being keyed thereto at $G^{21}$. The rod $G^{19}$ is apertured to receive the end of pin $G^{22}$ carried by shaft $G^{23}$ which is journaled on standards $G^{24}$ supported by the bracket $G^{25}$. The shaft $G^5$ is also journaled on this standard. The shaft $G^{23}$ is turned by means of the cam 29' which bears against roller $G^{26}$ at the end of lever $G^{27}$ fulcrumed on the shaft $G^{11}$ and having a spring $G^{28}$ attached to the other end thereof. At the same end is pivoted the rod $G^{29}$ pivoted to a crank $G^{30}$ mounted on shaft $G^{31}$. Pivoted to the same cranks at each end of shaft $G^{31}$ are rods $G^{32}$ having pivoted to the ends thereof the arms $G^{33}$ attached to sleeves $G^{34}$ on the shaft $G^{35}$. The shaft $G^{35}$ is tubular and the end of shaft $G^{23}$ extends therethrough. Collars $G^{36}$ and $G^{37}$ connected by micrometer adjustment $G^{38}$ are mounted on shafts $G^{23}$ and $G^{35}$. By this means the time of lift of the electrodes may be accurately fixed. As shown more particularly in Fig. 70, the end of lever $G^{39}$ is fulcrumed at $G^{40}$ and enters an aperture in the casing $G^3$. The pin $G^{40}$ is carried by the standard $G^{41}$ attached to the casing $G^4$. A spring $G^{42}$ is attached to the other end of the said lever and to the casing $G^4$. The tension of this spring serves to return the electrode after it is raised by rod $G^{19}$.

Mechanism is provided for shifting each of the pencils laterally so that a different point thereof will contact with the copper wire at each operation. The machine shown in the drawing is provided with mechanism for thus shifting the position of the pencil so that there will be four different points of contact. Mechanism is also provided for raising the pencil after each four welds a slight distance to compensate for the portion of the pencil which has been worn away. The aforesaid mechanism comprises the toothed wheel $G^{43}$ rotatably supported by the casing $G^4$ and carrying the cam $G^{44}$. The bed of the machine carries the stop mechanism $G^{45}$ for determining the welding position of the pencil. This comprises the stop-pin $G^{46}$, the threaded end $G^{47}$ of which enters and is supported by the bolt $G^{48}$. The pin $G^{46}$ may be horizontally adjusted by turning it in the bolt $G^{48}$ and it may be clamped therein by the screw $G^{49}$. The bolt $G^{48}$ is vertically adjustable with reference to the bed of the machine. The stop $G^{46}$ fixes the welding position of the pencil by contacting with a tooth of the wheel $G^{43}$. The teeth of the wheel $G^{43}$ are arranged in series of four which vary gradually in depth and as the said wheel is turned to bring a different tooth up into position to abut against the stop $G^{46}$, the welding position is changed horizontally a distance corresponding to the difference in depth of the adjacent teeth. The mechanism for turning the wheel $G^{43}$ comprises the pawl $G^{50}$ which is detachably mounted on the bolt $G^{48}$ of the stop mechanism $G^{45}$. The end of the said pawl extends beyond the end of the pin $G^{46}$ and contacts with a tooth of the approaching wheel $G^{43}$ causing the wheel to turn so as to bring the next tooth opposite to the stop $G^{46}$. When this has occurred four times one of the depressions, $G^{51}$, in the cam $G^{44}$ will assume a position opposite the end of the pawl $G^{52}$ causing the same to drop. The said pawl is pivoted at $G^{53}$ to the casing $G^4$ and carries the arm $G^{54}$ within which is adjustably held the pawl $G^{55}$. The dropping of the end of pawl $G^{52}$ into the depression of the cam $G^{44}$ causes the end of pawl $G^{55}$ to engage a tooth of the wheel $G^{56}$ mounted on shaft $G^{57}$ journaled in the casing $G^3$. The shaft $G^{57}$ carries the worm gear $G^{58}$ which engages the pinion $G^{59}$ which in turn engages with the rack $G^{60}$ formed on the holder $G^2$. With the pawl $G^{55}$ in this position the lowering of the casing $G^3$ turns wheel $G^{56}$ and this causes the pinion $G^{59}$ to be turned thus elevating the holder $G^2$ a slight distance to compensate for the wearing away of the pencil. The toothed wheel $G^{56}$ is normally prevented from turning by the stationary pawl $G^{61}$. As shown in detail in Figs. 78 and 79, the pinion $G^{59}$ may be pulled out of engagement with rack $G^{60}$ by means of knob $G^{62}$, so as to allow the rack to be elevated by hand for replacing the pencil. A lock $G^{62'}$ is provided for holding it when pushed back into engagement with the rack.

As shown in Fig. 2, the current for the welding operation is obtained from a suitable source, such as transformers $G^{63}$ and $G^{64}$, the former of which is connected to the stationary clamp of the long copper wire feed and to one of the electrode holders and the latter to an electrode holder and to the frame of the machine and so to the clamp of the transfer mechanism for the tube wire. Suitable insulation is provided to render the circuits distinct.

*Weld ejecting, clamps and associated mechanism.*—Referring to Figs. 4 and 4', it will be seen that the rod $H^1$, which actuates part of the mechanism which is now to be described, is pivotally supported on $H^2$, which is collared on the stud $H^3$ projecting from a bracket supported by the bed of the machine and carries the depending lug $H^4$ having the roller $H^5$ supported at the lower end thereof. The roller $H^5$ bears against the cam $H^6$ which is at the end of an arm $H^7$ extending from the lever $A^{28}$, which actuates the feeding and cutting mechanism for the longer copper wire. The rod $H^1$, as shown in Figs. 7, 8 and 9, is pivotally connected at its upper end to the end of an arm $H^8$ collared on shaft $H^9$. A spring $H^{10}$ surrounds the rod $H^1$ and is fastened to a sleeve $H^{11}$ thereon. When the lug $H^4$ is forced to the right to lower the rod $H^1$ the spring $H^{10}$ is compressed and upon its movement to the left said spring serves to raise the rod $H^1$. The shaft $H^9$ has collared thereon the arm $H^{12}$ at the end of which is pivoted pin $H^{13}$. As shown in Fig. 12', the pin $H^{13}$ has at its opposite end a collar $H^{14}$ which loosely fits around an arm $H^{15}$. A spring $H^{15'}$ surrounds pin $H^{13}$ being attached to a slidable washer $H^{16}$ which engages lugs $H^{16'}$ on arm $H^{15}$. The arm $H^{15}$ is collared on shaft $H^{17}$ which is mounted in bearings in standards $H^{18}$, $H^{19}$ and carries at its opposite end depending clamp arm $H^{20}$. This is adapted to engage the longer copper wire and hold it against the guide. The play between $H^{14}$ and $H^{15}$ allows this clamp to act slightly before the clamp which engages the top of the wire and which is described hereafter. The arm $H^{20}$ also carries the stop $F^{34}$ which engages the opening pin on the platinum finger to cause a discharge of the platinum wire.

A clamp $H^{21}$, as shown in detail in Figs. 92 to 94 inclusive, is provided for bearing down upon the end of the longer copper wire during the welding operation. This consists of a lower stationary member $H^{22}$ secured to a standard of the machine and an upper movable member $H^{23}$ carried by an arm $H^{24}$ collared on shaft $H^{25}$. As shown in Figs. 93, 94 and 95, the ends of both of these members preferably carry jewels $H^{26}$, which may be sapphires, so as to obtain an accurate bearing surface. Collared on shaft $H^{25}$ is an arm $H^{27}$ to which is connected by ball and socket joint rod $H^{28}$ pivoted at one end to the arm $H^{29}$ collared on shaft $H^9$. A spring $H^{30}$ surrounds the shaft $H^{25}$ and is supported so that it is put in tension by the opening of the clamp.

Mechanism is provided for ejecting the weld after its completion. The details of the main portion of this mechanism are shown in Figs. 87 to 91 inclusive, and comprise the arm $H^{31}$ collared at the end of shaft $H^9$ and carrying at its other end the adjustably held arm $H^{32}$. Pivoted at the end of $H^{32}$ is the fork $H^{33}$ which has a suitable shoulder $H^{34}$ so that its lowest position will be that shown in Fig. 87. Mounted loosely by means of arms near each end thereof is a member $H^{35}$ which when it is in normal position as shown in Fig. 87, is slightly spaced from the stationary guide $H^{36}$ upon which rests the longer copper wire during the welding operation. The member $H^{35}$ carries two pins $H^{37}$ which when the parts are in the position shown in Fig. 87 rest back of the longer copper wire. The member $H^{35}$ carries at its upper edge an abutment $H^{38}$ against which the shoulder $H^{34}$ strikes as the arm $H^{31}$ swings from the position shown in Fig. 87 to that shown in Fig. 88, thus elevating the member $H^{35}$. The continued movement of the arm $H^{31}$ to the position shown in Fig. 89 causes the shoulder $H^{34}$ to clear the abutment $H^{38}$ and the member $H^{35}$ swings back to its original position. Upon the return of the arm $H^{31}$ to the position shown in Fig. 87 the shoulder $H^{34}$ clears the abutment $H^{38}$ after which the shoulder assumes the position shown in Fig. 87. As shown in Fig. 13, a spring $H^{39}$ surrounds the shaft $H^{17}$ and is so connected with the member $H^{35}$ that it is put in tension by the opening of said member and serves to return it to its original position at the proper time. A stop $H^{39'}$ serves to fix the closed position of $H^{35}$. Mounted also on shaft $H^{17}$ is a collar $H^{40}$ carrying a lug $H^{41}$. This engages the leg $H^{42}$ on a collar $H^{43}$ which is fast to shaft $H^{44}$ supported in the bearing on standard $H^{18}$. The opposite end of the same carries an arm $H^{45}$ having extending therefrom the pin $H^{46}$. A spring $H^{47}$ serves to keep the lug $H^{42}$ in contact with the lug $H^{41}$. The pin $H^{46}$ is adapted to contact with one of the pins $C^{33}$ carried by the movable jaw on the tube wire transferring mechanism, as shown in Figs. 35, 37, 90 and 91, and causes the pins $C^{33}$ to strike against the tube wire after the welding operation and to assist in the ejection of the completed weld, it being understood that the upper movable jaw of the tube wire transferring mechanism is raised at this time.

*Pencil cutting mechanism.*—Referring to Figs. 1, 2, 66 and 80 to 86, inclusive, it will be seen that the cutting mechanism comprises a pair of cutters $K^1$, $K^2$ which are shaped so as to receive the ends $K^3$, $K^4$ respectively of the graphite pencils and to cut the same to proper shape. These cutters are on shafts $K^5$ and $K^{5'}$ and are contained within a casing $K^6$ which is slotted at $K^7$ to allow the passage of the electrode pencils. A conduit $K^8$ is connected to the casing $K^6$ and to the hollow shaft $K^9$ to which it is swiveled. A conduit $K^{10}$ leads from the said shaft to a fan $K^{11}$, in Fig. 1, or other means for creating suction so as to draw off the cuttings from the pencils. The fan is driven by the motor $K^{12}$, in Fig. 2, through pulleys $K^{13}$ and $K^{14}$, the latter being mounted on shaft $K^{15}$. Also mounted on the said shaft is the pulley $K^{16}$, which drives the pulley $K^{17}$ on the shaft $K^5$ by means of the belt $K^{18}$ which runs over the pulley $K^{19}$. The cutters $K^1$ and $K^2$ are separately adjustable. $K^1$ is mounted loosely on shaft $K^{5'}$ and is driven by $K^2$ through a pin $K^{5''}$. The position of the shaft $K^{5'}$ is adjusted through micrometer $K^{20}$ acting through levers $K^{21}$, $K^{22}$ pivoted on lugs $K^{23}$ and $K^{24}$ on plate $K^{25}$. The cutter $K^2$ is mounted on hollow shaft $K^5$ carried by plate $K^{25}$. The said plate and the shaft $K^5$ are adjusted by means of micrometer $K^{26}$ acting through crank $K^{27}$ fast to $K^{25}$ and having its other end pivoted to a sleeve on shaft $K^{28}$. Owing to the fact that if it remained in its cutting position the cutting mechanism would interfere with the movement of the tube transferring mechanism, means are provided for lifting it to allow the passage of this mechanism and lowering it immediately thereafter. This is effected by means of the cam 28, which acts upon the roller $K^{30}$ at the end of the lever $K^{31}$ fulcrumed at $K^{32}$ to the standard $K^{33}$. A vertical rod $K^{34}$ is supported by a ball and socket joint at the end of said lever and is attached by a similar joint to the plate $K^{25}$, as shown in Fig. 80. The plate $K^{25}$ which carries the cutters at one end is swiveled on the shaft $K^9$. The bed-plate of the machine carries an adjustable stop $K^{35}$. A lug $K^{36}$ carried by the journal for the shaft $K^5$ is adapted to strike against the said stop when the cutters are in the proper position to receive the electrode pencils.

*Weld collecting and counting mechanism.*—The mechanism for transferring the weld to the collecting trough after it has been ejected comprises a trough formed of the two movable members $L^1$ and $L^2$. The member $L^1$ is carried by the two rods $L^3$ and $L^4$. The rod $L^3$ is fast to a shaft $L^5$ which extends through the bearing plate $L^6$ and, as shown in Fig. 59, has collared thereon the arm $L^7$ to which is pivoted the rod $L^8$ pivoted to a lug $L^9$ on a sleeve on the shaft $F^7$. As shown in Fig. 65, the said sleeve has attached to another lug $L^{10}$ thereon the rod $L^{11}$ which is pivoted to the arm $L^{12}$ fulcrumed at $L^{13}$ to the bed of the machine and carrying at its other end the roller $L^{14}$ bearing against cam 30. A spring $L^{15}$ serves to press the roller against the cam. The rod $L^4$ is mounted on an idle shaft $L^{16}$. Both the shafts $L^5$ and $L^{16}$ are also mounted in corresponding bearings at the other end of the mechanism, as shown to the left of Fig. 40. At the other end of shafts $L^3$ and $L^4$ are shafts $L^{17}$ and $L^{18}$ which also extend to the other end of the mechanism. The member $L^2$ is loosely supported on the shaft $L^{18}$, and, as shown in Fig. 53, a spring $L^{19}$ surrounds the said shaft and is connected at one end to a collar $L^{20}$ thereon, and at the other end to the lug $L^{21}$ attached to the member $L^2$. The collar $L^{20}$ has a dog $L^{22}$ extending therefrom and when the parts reach the position shown in Fig. 58 this engages the lug $L^{23}$ attached to the member $L^2$. As the parts move from the position shown in Fig. 57 to that shown in Fig. 58, the rod $L^3$ is turned by the shaft $L^5$ and the rod $L^4$ turns with the loose shaft $L^{16}$ and the member $L^1$ is carried to a substantially vertical position to the left of the said shafts. Meanwhile the lug $L^{23}$ engages the lug $L^{22}$ and tilts the member $L^2$ so as to open the trough at the bottom and allow the weld to drop out.

The weld drops from the trough $L^1$, $L^2$ to a trough formed by the movable sections $L^{24}$, $L^{25}$. The section $L^{25}$ is mounted upon an idle shaft $L^{26}$ which carries a gear segment meshing with a similar segment $L^{28}$ on the shaft $L^{29}$ supporting the other section $L^{24}$. The shaft $L^{29}$ is driven as hereinafter described.

The counting mechanism $L^{30}$, which may be of any well-known type, is driven, as shown in Fig. 53, by the arm $L^{31}$ fast on shaft $L^{32}$ which is turned by the arm $L^{33}$ having pivoted thereto the vertically extending rod $L^{34}$ which is pivotally connected to pin $L^{35}$ extending from the lever $A^{26}$ which operates the long copper wire feeding and cutting mechanism. A shaft $L^{36}$ of the counting mechanism carries the star-wheel $L^{37}$. A pin $L^{38}$ slidably supported in bearing $L^{39}$ engages the said star-wheel. The movement of the star-wheel is so adjusted that when, for instance, 200 welds have been registered, pin $L^{38}$ is pushed to the right by wheel $L^{37}$ carrying the collar $L^{40}$ having thereon the pin $L^{41}$ and causes the said pin to pass through an aperture in the arm $L^7$ and to engage the lever $L^{42}$. The arm $L^7$ forms part of the weld discharging mechanism and by reason of the engagement of the pin $L^{41}$ forces the lever $L^{42}$ downwardly. The end of the latter is connected by a spring $L^{43}$ with a pin on the arm $L^{44}$ which is fast to the operating shaft $L^{29}$ for opening the trough $L^{24}$, $L^{25}$, as hereinbefore described. The movement of the lever $L^{42}$ causes the shaft $L^{29}$ to be turned, and owing to the intermeshing gears $L^{27}$, $L^{28}$, the trough $L^{24}$, $L^{25}$ is opened allowing the welds collected therein to be discharged. By this time the star-wheel $L^{37}$ has turned so that the pin $L^{38}$ is forced to the left by pin $L^{45}$, actuated by the counting lever arm $L^{31}$ and engaging collar $L^{46}$ on pin $L^{38}$ and the pin $L^{41}$ is withdrawn from the arm $L^7$. The counting then proceeds as before and when the 200 welds have accumulated again the dumping operation is repeated.

*Automatic Safety Clutch and Operating Mechanism.*—The clutch M connects the shaft 14 with the drive pulley 12 and is thrown out when either of the copper wires becomes twisted or tangled. As shown in Figs. 96, 97 and 98, the operating mechanism for the clutch comprises the double solenoid $M^1$ which is suitably connected to a source of energy such as a battery (not shown) and to the contact rings $M^2$ shown in Fig. 4, and $M^3$ shown in Fig. 18, having openings concentric with the normal path of the wire. A suitable return circuit is provided to the battery. When either of the copper wires departs from the straight line of its normal feed so as to engage the sides of the contact ring, the solenoid $M^1$ is energized and a core $M^4$ contained therein is drawn upwardly. The said core has extending upwardly therefrom the rod $M^5$ which is movable in a guide sleeve $M^6$ supported on the frame of the machine. On top of the said sleeve is a cylindrical casing $M^7$ supporting the sleeve $M^8$ which is continuous at one end $M^9$ and slotted at $M^{10}$ through most of its extent. A block $M^{11}$ is supported within the said sleeve and has pivoted to one end thereof the bell-crank $M^{12}$, $M^{13}$. The other end of the member $M^{12}$ is notched so as to be held in its lowest position by the edge of the part $M^9$. The block $M^{11}$ carries at its other end a roller $M^{14}$ which in the retracted position of the block, as shown in Figs. 96 and 97, clears the cam 15. Pivoted at one end of the member $M^{13}$ is a lever $M^{15}$ which is pivoted at its other end to the arm $M^{16}$. The pin $M^{17}$ is fast to the lever $M^{15}$ and is attached at one end thereof to the spring $M^{18}$, which is connected at its other end to the fulcrum of arm $M^{16}$. The arm $M^{16}$ is connected to rod $M^{19}$ which is pivoted at $M^{20}$ and attached at one end to the clutch member $M^{21}$. The clutch M is a well-known friction clutch and comprises the stationary sleeve $M^{22}$ mounted on the shaft 14' in slots of which are pivoted the levers $M^{23}$ carrying stops $M^{24}$ adapted to engage the inclined portion $M^{25}$ of the movable member $M^{21}$. The clutch contact members $M^{26}$ are pivoted to the levers $M^{23}$.

With the parts in the position shown in Fig. 97 the shaft 14 is driven by the pulley 12. Upon the energizing of the solenoid the pin $M^5$ displaces the member $M^{12}$ from its engagement with the sleeve end $M^9$. The spring $M^{18}$ then serves to force the block $M^{11}$ to the left as shown in Fig. 98. In this position the roller $M^{14}$ contacts with the cam 15 and the sleeve $M^{10}$ with the parts carried thereby and the arm $M^{16}$ are forced to the right causing the clutch member $M^{21}$ to move to the left and to allow the disengagement of the clutch. When the copper wire feed has been fixed the clutch M is thrown in by hand by means of the rod $M^{19}$, the pin $M^{17}$ having been pushed to the right to set the part $M^{12}$ in engagement with $M^9$, as shown in Fig. 96. This will cause the parts to assume the position shown in Figs. 96 and 97.

What we claim as new and desire to secure by Letters Patent of the United States, is:—

1. An automatic welding machine comprising means for accurately spacing ends of two wires facing each other, means for placing a third wire in contact with said ends, and means for fusing each of the said ends so as to unite thereto the said third wire.

2. An automatic welding machine comprising means for supporting two wires in substantially horizontal position and for accurately spacing their ends facing each other, means for placing a third wire upon said ends, and means for fusing each of the said ends so as to unite thereto the said third wire.

3. An automatic welding machine comprising means for shaping ends of two wires so as to receive a third wire, means for accurately spacing said ends relatively to each other, means for placing the third wire in contact with said ends, and means for fusing said ends to unite thereto the said third wire.

4. An automatic welding machine comprising means for shaping ends of two wires so as to receive a third wire, means for supporting the said two wires in substantially horizontal position and for accurately spacing their said ends relatively to each other, means for placing the third wire in contact with said ends, and means for fusing said ends to unite thereto the said third wire.

5. An automatic welding machine comprising means for forming a groove at an end of each of two wires, means for accurately spacing said ends relatively to each other, means for inserting the ends of a third wire in said grooves, and means for fusing the first mentioned ends so as to unite thereto the ends of the said third wire.

6. An automatic welding machine comprising means for continuously feeding two wires, means for cutting predetermined lengths therefrom, means for supporting the said lengths with their ends accurately spaced apart and facing each other, means for placing a third wire in contact with said ends, and means for fusing said ends to unite thereto the said third wire.

7. An automatic welding machine comprising means for continuously feeding two wires, means for cutting predetermined lengths therefrom, means for shaping an end of each of said wires to receive a third wire, means for supporting said lengths with said ends accurately spaced apart, means for placing a third wire in contact with said ends, and means for fusing said ends to unite thereto said third wire.

8. An automatic welding machine comprising means for continuously feeding two wires, means for cutting predetermined lengths therefrom, means for forming a groove in an end of each of said lengths, means for supporting said lengths with said ends accurately spaced apart, means for placing the ends of a third wire in said grooves, and means for fusing the said grooved ends to unite thereto said third wire.

9. An automatic welding machine comprising means for continuously feeding two wires toward each other, means for cutting predetermined lengths therefrom, means for supporting said lengths with their ends accurately spaced apart, means for shaping the contiguous ends of said lengths to receive a third wire, means for shaping the other end of one of said lengths in a predetermined manner, means for placing a third wire upon said contiguous ends, and means for fusing said ends to unite thereto the said third wire.

10. An automatic welding machine comprising means for continuously feeding two wires toward each other, means for cutting predetermined lengths therefrom, means for supporting said lengths with their ends accurately spaced apart, means for forming a groove in each of the contiguous ends of said lengths and in the other end of one of said lengths, means for placing a third wire in the grooves of the contiguous ends, and means for fusing said ends to unite thereto the said third wire.

11. An automatic welding machine comprising means for continuously feeding two wires toward each other, means for cutting predetermined lengths therefrom, means for supporting said lengths with their ends accurately spaced apart, means for shaping the contiguous ends of said lengths to receive a third wire, means for forming a tube at the other end of one of the said lengths, means for placing a third wire upon said contiguous ends, and means for fusing said ends to unite thereto the said third wire.

12. An automatic welding machine comprising means for continuously feeding two wires toward each other, means for cutting predetermined lengths therefrom, means for supporting said lengths with their ends accurately spaced apart, means for forming a groove at each of the contiguous ends of said lengths, means for forming a tube at the other end of one of said lengths, means for placing the ends of a third wire in said grooves, and means for fusing said grooved ends to unite thereto the said third wire.

13. An automatic welding machine comprising means for accurately spacing the ends of two wires relatively to each other, continuously operated means for feeding a third wire, cutting a length therefrom and for placing the said length in contact with the said ends, and means for fusing each of the said ends so as to unite thereto the said third wire.

14. An automatic welding machine comprising means for supporting two wires in substantially horizontal position and for accurately spacing their ends relatively to each other, means for feeding a third wire, cutting a length therefrom and placing the said length upon the said ends, and means for fusing each of the said ends so as to unite thereto the said third wire.

15. An automatic welding machine comprising means for continuously feeding two wires toward each other, means for cutting predetermined lengths therefrom, means for supporting said lengths with their ends accurately spaced apart, means for continuously feeding a third wire, cutting a length therefrom and placing the said length in contact with the aforesaid ends, and means for fusing said ends to unite thereto the said third wire.

16. An automatic welding machine comprising means for continuously feeding two wires toward each other, means for cutting predetermined lengths therefrom, means for shaping an end of each of said wires to receive a third wire, means for supporting said lengths with said ends accurately spaced apart, means for continuously feeding a third wire, cutting a length therefrom and placing the same upon the said ends, and means for fusing the said ends to unite thereto the said third wire.

17. An automatic welding machine comprising means for continuously feeding two wires toward each other, means for cutting predetermined lengths therefrom, means for supporting the said lengths with their ends accurately spaced apart, and means comprising a conductor mounted so as to contact with either of said wires upon its departure from the correct line of feed to stop the operation of the aforesaid parts.

18. An automatic welding machine comprising means for feeding two wires and for accurately spacing the ends of the same relatively to each other, and means disposed adjacent to the final position of each of said wires for stopping the operation of the said parts upon the departure of either of the said wires from the line of feed.

19. An automatic welding machine comprising means for supporting two wires with their ends accurately spaced apart and facing each other, means for placing a third wire upon said ends, means for uniting said third wire to the said ends, means for releasing said supporting means after the completion of the union, and means for ejecting the united wires.

20. An automatic welding machine comprising means for accurately spacing the ends of two wires facing each other, means for placing a third wire in contact with the said ends, means for fusing the said ends to unite thereto the said third wire, and means for ejecting the united wires.

21. An automatic welding machine comprising means for accurately spacing the ends of two wires relatively to each other, means for uniting the said ends of a third wire, means for ejecting the united wires, and means for counting the same and collecting a predetermined number thereof.

22. An automatic welding machine comprising means for welding together the ends of two wires, means for ejecting the completed weld, collecting means for the said welds, and means for discharging the said collecting means after the collection of a predetermined number thereof.

23. An automatic welding machine comprising means for accurately spacing the ends of two wires facing each other, means for placing a third wire in contact with the said ends, and electrical means for fusing each of the said ends so as to unite thereto the said third wire.

24. An automatic welding machine comprising means for accurately spacing the ends of two wires facing each other, means for placing a third wire in contact with said ends, a pair of electrodes, and means for passing an electric current through said ends and the said electrodes to fuse each of the said ends so as to unite thereto the said third wire.

25. An automatic welding machine comprising means for accurately spacing the ends of two wires relatively to each other, means for placing a third wire in contact with the said ends, a pair of electrodes, means for passing an electric current through said electrodes to fuse each of the said ends and to unite thereto the said third wire, and means for shifting the positions of the said electrodes to compensate for their wearing away.

26. An automatic welding machine comprising means for accurately spacing the ends of two wires relatively to each other, means for placing a third wire in contact with said ends, a pair of electrodes, means for passing an electric current through said ends and said electrodes, means for periodically shaping the said electrodes, and means for shifting the positions of the same to compensate for the said shaping.

27. An automatic welding machine comprising means for accurately spacing the ends of two wires relatively to each other, means for placing a third wire in contact with said ends, a pair of electrodes, means for passing an electric current through said ends and the said electrodes, and means for moving the said electrodes laterally and vertically to compensate for their wearing away.

28. In a machine for welding wires together, an electrode, means for passing an electric current through the said electrode and a portion of one of the said wires to fuse the latter, and means for shifting the position of the said electrodes in two directions with reference to the said wires to compensate for its wearing away.

29. In a machine for welding wires together, means for supporting said wires in substantially horizontal position, an electrode support below the said wires, means for passing an electric current through the said electrode and a portion of one of the said wires to fuse the latter, and means for shifting the position of the said electrode laterally and vertically to compensate for its wearing away.

30. In an automatic machine for welding wires together, means for supporting said wires in substantially horizontal position, an electrode mounted below the said wires, a mechanism for shaping the end of said electrode, means for moving said electrode from operative position with respect to the said wires to said shaping mechanism and back again, and means disposed so as to be operated by the electrode during its travel for shifting the position thereof to compensate for wear.

31. In an automatic welding machine, a means for continuously feeding a wire, means disposed out of line with the said feeding means for feeding another wire and cutting lengths therefrom, means for transferring the said lengths one at a time to a position substantially in line with the first mentioned wire and with one of its ends adjacent to that of the first mentioned wire, and means for shaping the other end of said length.

32. In an automatic welding machine, a means for continuously feeding a wire, means disposed out of line with the said feeding means for feeding another wire and cutting lengths therefrom, means for transferring the said lengths one at a time to a position substantially in line with the first mentioned wire and with one of its ends adjacent to that of the first mentioned wire, and means for shaping the other end of said length while it is held by said transferring means.

33. In an automatic welding machine, a means for continuously feeding a wire, means disposed out of line with the said feeding means for feeding another wire and cutting lengths therefrom, means for transferring the said lengths one at a time to a position substantially in line with the first mentioned wire and with one of its ends adjacent to that of the first mentioned wire, and means in line with said first mentioned feeding means for shaping the other end of said length.

34. An automatic welding machine comprising means for feeding a wire, means disposed out of line with the said feeding means for feeding two other wires and cutting lengths therefrom, means for transferring the said lengths to positions in line with the first mentioned wire and means for shaping an end of one of said wires while it is held by said transferring means.

35. An automatic welding machine comprising means for feeding a wire, means disposed out of line with the said feeding means for feeding two other wires and cutting lengths therefrom, means for transferring the said lengths to positions in line with the first mentioned wire, and means in line with said first mentioned feeding means for shaping an end of one of said wires while it is held by said transferring means.

36. In a machine for uniting wires, the combination of means for feeding a wire longitudinally thereof, means for shaping an end of the said wire to receive the end of a second wire, means for placing the end of the said second wire in contact with the shaped end of the first wire, and electrical heating means for uniting the said ends.

37. In a machine for uniting wires, the combination of means for feeding a wire longitudinally thereof, means for shaping an end of the said wire to receive the end of a second wire, means for feeding the second wire, cutting a length therefrom and placing an end of the said length in contact with the shaped end of the first wire, and electrical heating means for uniting the said ends.

38. In a machine for uniting wires, the combination of means for feeding a wire longitudinally thereof, means for shaping an end of said wire to receive the end of a second wire, means for feeding the second wire longitudinally thereof, cutting a length therefrom and transferring the said length into contact with the shaped end of the first wire, and electrical heating means for uniting the said ends.

In witness whereof, we have hereunto set our hands this 24th day of July, 1914.

JOHN T. FAGAN.
CLEVELAND H. QUACKENBUSH.

Witnesses:
J. F. DONOVAN,
JOHN E. RYAN.

Copies of this patent may be obtained for five cents each, by addressing the "Commissioner of Patents, Washington, D. C."